US008394879B1

(12) United States Patent
Bradshaw

(10) Patent No.: US 8,394,879 B1
(45) Date of Patent: Mar. 12, 2013

(54) POLYOLEFIN COMPOSITIONS ADAPTED TO REPLACE FLEXIBLE POLYVINYLCHLORIDE AND OTHER ELASTOMERIC COMPOSITIONS

(75) Inventor: Howard Grant Bradshaw, Douglasville, GA (US)

(73) Assignee: Dynamic Modifiers, LLC, Atlanta, GA (US)

( * ) Notice: Subject to any disclaimer, the term of this patent is extended or adjusted under 35 U.S.C. 154(b) by 0 days.

(21) Appl. No.: 13/097,034

(22) Filed: Apr. 28, 2011

Related U.S. Application Data

(60) Provisional application No. 61/329,533, filed on Apr. 29, 2010.

(51) Int. Cl.
*C08K 3/32* (2006.01)
*C08K 3/22* (2006.01)

(52) U.S. Cl. ........................................ 524/414; 524/432

(58) Field of Classification Search ............... 524/414, 524/409, 432
See application file for complete search history.

(56) References Cited

U.S. PATENT DOCUMENTS

| 5,891,571 | A | * | 4/1999 | Herbert | 428/379 |
| 2006/0270298 | A1 | * | 11/2006 | Kuhn et al. | 442/260 |
| 2008/0214715 | A1 | * | 9/2008 | Costanzi | 524/414 |
| 2010/0324182 | A1 | * | 12/2010 | Ing.Roth | 524/101 |

FOREIGN PATENT DOCUMENTS

WO    WO 2009/080554 A1  *  7/2009

* cited by examiner

*Primary Examiner* — Hui Chin
(74) *Attorney, Agent, or Firm* — Sanford Jay Asman

(57) ABSTRACT

Compositions of polyolefins having properties, including flame retardancy, of polyvinylchloride ("PVC") and other elastomeric compositions, are described. Also described are the manner in which the constituency of such compositions affects their ultimate properties, including flexibility and flame retardancy, whereby appropriate formulations, suitable for substitution for PVCs, can be achieved.

9 Claims, No Drawings

US 8,394,879 B1

POLYOLEFIN COMPOSITIONS ADAPTED TO REPLACE FLEXIBLE POLYVINYLCHLORIDE AND OTHER ELASTOMERIC COMPOSITIONS

CROSS-REFERENCE TO RELATED APPLICATION

This application claims the benefit of the filing date of U.S. provisional application Ser. No. 61/329,533 entitled Polyolefin Compositions And Their Use As Replacement Materials Where Flexible Polyvinylchloride And Other Elastomeric Compositions Are Used, filed Apr. 29, 2011.

BACKGROUND OF THE INVENTION

The present invention relates to polyolefin compositions which can be used to replace flexible polyvinylchloride (PVC or "vinyl").

Flexible PVC compositions are the formulated polymer compositions used to create and manufacture a wide variety of intermediate applications including melt extruded single and multilayered cast, calendared, and blown film constructions, melt extrusion coated fabrics or other melt extrusion coated constructions, extruded profiles, extruded sheet and injection molded parts. These intermediate applications are then used to construct or manufacture end use products such as wall coverings, mattresses and bedding, seating, notebook and other book covers, packaging, many kinds of tubing, floor coverings, window treatments, labels and signage and many kinds of coated or laminated fabrics. Flexible PVC compositions are often composed of a plethora of other chemical additives that are critical to imparting the functional performance to the flexible PVC composition. The choice of such chemical additives used to modify the unmodified polyvinylchloride polymer to formulate the flexible PVC composition are chosen by one skilled in the art according to known properties that are imparted to the overall final composition. These chemical additives and the amounts used (the relative concentration based on the weight of the polyvinylchloride polymer) are chosen so that the final flexible PVC composition has the minimal and/or appropriate final properties required so that when the flexible PVC composition is melt extruded or formed into a final shape or part, the final end use application has the required, appropriate or minimal end use properties.

For example, U.S. Pat. No. 5,891,571 entitled Fire-Resistant PVC Formulation which issued on Apr. 6, 1999 to M. J. Herbert teaches the formulation of fire resistant flexible PVC compositions that have improved flame retardant properties. Herbert teaches that the use of relatively low levels of certain metallic stannates when used in combination with antimony trioxide and ammonium octamolybdate as flame retardant and smoke suppressant additives in flexible PVC compositions yields surprisingly low off gassing characterized by lower concentrations of smoke (lower smoke density results) and lower heat release rates when the flame retardant flexible PVC compositions are subjected to cone calorimeter tests per ASTM 1354. Obtaining lower smoke density and lower heat release rates is an important and desirable property especially as it applies to many of the end use applications in which an improved flame retardant flexible PVC composition could be used. If the composition taught by Herbert were used for wire and cable jacketing, for example, lower rates of smoke evolution and lower heat release rates from the partial combustion of the wire and cable jacketing present in the vicinity of the fire might allow a person escaping from a fire a longer time for egress. Therefore, one can see that Herbert teaches the use of certain combinations of additives that are to be used in the flexible PVC formulations that yield end use compositions that are suitable and even desirable for applications that might require the benefit of those unique additive modifications to the flexible PVC composition. Additionally, there are many other examples (See, for example, U.S. Pat. Nos. 3,941,908, 4,892,683, 5,013,782, 5,356,710, 6,114,425, 5,008,323) that demonstrate repeated attempts to improve flexible PVC compositions so that the functionality of the resultant flexible PVC compositions better satisfy and improve upon the end use properties and performance characteristics of the end use applications in which it is used. However, such improvements to flexible PVC compositions and the applications in which it is used do nothing to address the regulatory and commercial trend to completely eliminate the use of flexible PVC and/or many of its compositional additives used to formulate it for its various end uses.

Currently, there is a strong commercial trend for many manufacturers to move away from using flexible PVC to manufacture the products they produce. Recent new federal regulatory statutes, like the Consumer Product Safety Commission Improvement Act (CPSIA), provide good examples that reinforce the notion of a strong trend both domestically and globally of manufacturers choosing, or being forced, to use alternative polymeric materials as replacements for flexible PVC to create the end use products they produce. For example, there are a great number of child care products that have required the use of a flexible PVC laminated films and coatings in order to provide quick clean up features to juvenile care products like bedding, cribs, blankets, clothing, play pins, etc. Often these child care products are constructed in such a way that the flexible PVC film is laminated onto a substrate and decoratively printed. The end use "film coated fabric" or "laminated fabric" is ideal for use in the aforementioned juvenile care products, in the bedding ticking for example, and as a further functional requirement needs to remain soft and pliable to the touch and handling. In the case of juvenile bedding, federal law (CPSIA, above) now prohibits the soft, pliable, durable, highly decorative and economical juvenile bedding ticking from containing certain phthalate plasticizers which typically are an important, if not critical, flexible PVC additive that imparts various important flexible and other mechanical properties to the flexible PVC film composition. Additionally, the same flexible PVC laminated fabric needs to allow the mattress it is used to construct to comply with another recent federal statute governed by compliance with the Standard for the Flammability (Open Flame) for Mattress Sets, 16 CFR Part 1633. Thus, it appears that in the case of juvenile care products that have historically been manufactured using flexible PVC laminated fabrics, and especially juvenile care products made with flexible PVC laminated fabrics that require flame retardancy, manufacturers of such juvenile care products are being forced to identify and use alternative polymeric compositions that have similar or acceptable functionality and economics of flexible PVC to manufacture their products in order to comply with federal safety statutes.

In addition to statutory reasons for the commercial trend towards using alternative, but functionally equivalent, replacement polymers for flexible PVC, there is increasing pressure to do so being imposed upon various large companies, including leading retailers and technology leaders, which have been making public marketing announcements that they will voluntarily eliminate or reduce their use of flexible PVC to manufacture or package their products. For example, Microsoft announced that by the end of 2005 it will have completed its PVC packaging phase out, which has already resulted in the elimination of 361,000 pounds of PVC since July, 2005. Crabtree & Evelyn, an international manufacturer and retailer of personal care products, toiletries, home fragrance products and fine foods, announced it will phase out PVC in its packaging. Crabtree & Evelyn has already begun to phase out PVC in existing and all new product lines, and is developing a complete PVC phase out timeline. Kaiser Permanente, the largest non-profit health care system in the U.S. announced that it was phasing out PVC wherever possible in millions of square feet of new construction to be built over the next decade. Kaiser vendors have developed PVC-free wall protection products and PVC-free carpeting. Other recent PVC phase-out announcements include the following:

- Catholic Healthcare West, a healthcare system with 40 hospitals, announced on Nov. 21, 2005 that it awarded a five year, $70 million contract to B. Braun to supply CHW with PVC-free and DEHP-free (a common phthalate plasticizer) IV systems.
- Hewlett Packard (HP) announced on Nov. 1, 2005 that it plans to eliminate its remaining uses of PVC as safer alternatives become available. The company has removed PVC from all external case parts. In correspondence with HP, they noted that they were eliminating all PVC packaging. The Computer Take Back Campaign has worked with HP and other electronic companies to replace PVC and other harmful materials of concern with safer alternatives.
- Wal-Mart announced on Oct. 24, 2005 that it will phase out PVC in its private label packaging over the next two years.
- Firestone Building Products Company, the world's largest manufacturer of commercial roofing, closed down its PVC line in late 2005 in favor of safer materials. This represents some six thousand tons of PVC production annually.
- Shaw Industries Inc. ran its last production of PVC carpet backing at the beginning of 2005, replacing it with Eco-Worx, a cradle-to-cradle product that can be sustainably recycled, has less embodied energy than PVC carpet tiles, and maintains equal or greater performance.
- Johnson and Johnson announced it has set a goal to eliminate PVC in its primary packaging, and it is actively engaged with suppliers to identify alternatives to replace existing PVC packaging and avoid PVC use in future products.

All of the foregoing examples of major manufacturers and retailers are part of a broader economic trend in which US businesses are increasingly eliminating the use of flexible PVC compositions from the manufacture of their products and packaging of the products and instead announcing the use of what is perceived as safer and more environmentally sustainable alternatives.

Other major companies seriously affected by the current global economic recession, which are trying to recoup lost revenues are faced with following the larger companies' environmental marketing lead, and they are trying to either differentiate their products as more environmentally sustainable or comply with the aforementioned regulatory statutes as well.

At the forefront of negative marketing that is common is the fact that flexible PVC has been found to release dioxins when burned or overheated during extrusion processing of flexible PVC polymeric compositions. Dioxins are considered extremely toxic and have been found in some studies to cause cancer and harm the immune and reproductive systems. Studies have shown plasticizers such as phthalates have migrated out of PVC consumer products, exposing people to toxic additives linked to reproductive defects and other health problems.

Further, PVC cannot be effectively recycled due to the many incompatible additives used to soften or stabilize PVC, which can catastrophically contaminate a recycle stream when other polymeric thermoplastics are present in the recycle batch. Therefore, flexible PVC is increasingly being eliminated as an option when developing polymeric compositions for end use applications. More importantly, and of particular relevance to the present invention, is the need to replace the use of flexible PVC compositions in existing applications or where flexible PVC would have been the polymer composition of choice if it were perceived to be an environmentally sustainable option in new applications. More particularly, the choice of polymeric compositions that can economically be used to replace flexible PVC use in the manufacture of films, films laminated onto substrates, films directly extruded onto fabrics, yarns and other substrates that meet or exceed the regulatory, safety, flame retardant, mechanical performance, flexibility, and ease of processing that is either now required or well established from historical use of flexible PVC in existing end use applications. These end use applications include, but are not limited to, automotive interiors, wall coverings, upholstery, advertising banners and films, tenting, coated yarns and coated yarn fabrics, window treatment fabrics, and floor covering applications.

Polyolefins comprise the largest volume of thermoplastics consumed globally. It is well known in the art that polyolefins have many uses and can be combined with a plethora of additives and colorants to yield wide variety of useful end use properties for numerous end use applications. Of particular interest is the ease of processing, competitive economics, ease of chemical and down stream modification, excellent availability, ease of recycling, and an increasingly more chemically efficient methods of imparting flame retardant properties. For example, in U.S. Pat. Nos. 6,384,123 and 6,437,035, Young teaches the use of polyolefinic elastomeric compositions with improved mechanical, melt processing, and flame retardant properties for use in various film applications. In particular, Young teaches, in U.S. Pat. No. 6,384,123 that his polyolefin elastomeric film's composition contains, among other additives, a filler, aluminum trihydrate, that yields a composition with a limited oxygen index of 22. An oxygen index of 22 is considered to be "barely flame retardant" as ambient air at sea level contains about 21% oxygen. Therefore, Young improves on his invention further when he teaches in U.S. Pat. No. 6,437,035 a similar, yet improved polymeric composition used for similar applications where he has employed the use of halogenated flame retardants with the use of flame retardant synergists and smoke suppressants and/or hydrated mineral fillers like aluminum trihydrate and magnesium hydroxide to obtain much better flame retardant performance yielding limited oxygen indices of 26 to 31. While Young teaches this compositional use in films of 20 mils or less, Young does not teach that his polymeric compositions impart flame retardant characteristics to the substrates to which they are adhered, only that they are capable of being handled so that they may be laminated onto supporting scrims and the like. Also, the use of halogenated flame retardants in elastomeric polyolefin compositions to achieve higher oxygen index numbers and improved flame retardant properties while achieving an amorphous composition with a wide enough processing window so that the composition can be processed by a calendar to obtain films of 0.010 inch (10 mils) thickness as taught by Young is at the expense of using high levels of described halogenated flame retardants and antimony synergists resulting in higher raw material costs, higher processing costs, toxic off gassing during combustion and little to no chance of being able to extrude his compositions using standard polyolefin extrusion techniques, which is by single or twin screw extrusion methods, not calendaring. As he indicates in the detailed description of his invention, calendaring a polymer is usually reserved for completely amorphous polymeric compositions such as flexible PVC.

Further improvements to flame retardant polyolefinic compositions are taught by Costanzi in United States Patent Publication No. US2008/0214715 which teaches the use of certain synergistic mixtures of hypophosphorous acid metal salts and halogenated organic compounds. Of particular interest is his choice of their use in "moulding" compositions to achieve high levels of flame retardancy, particularly Underwriters Laboratories UL-94 specification. Unfortunately, Costanzi never teaches the use of his novel flame retardant technology for use in other applications, such as polyolefin elastomeric extruded films, blown films, cast extrusion coated films onto substrates like fabrics and scrims, calendered films, coated yarns and as an additive for fiber and yarn applications.

There are many end use applications such as automotive interiors, wall coverings, upholstery, advertising banners and films, tenting, coated yarns and coated yarn fabrics, window treatment fabrics, and floor coverings where elastomeric polyolefin polymer compositions could be used if only one could achieve high levels of flame retardancy, ease of processing, lower extrusion and down stream conversion costs, little to no toxic off-gassing, low smoke density during combustion, excellent mechanical properties, desirable hand characteristics and flexibility, ease of printing, excellent adhesion to a variety of substrates, low specific gravity and overall low raw material costs.

SUMMARY OF THE INVENTION

What is needed are elastomeric polyolefin compositions that achieve high levels of flame retardancy, ease of processing, lower extrusion and down stream conversion costs, little to no toxic off-gassing, low smoke density during combustion, excellent mechanical properties, desirable hand characteristics and flexibility, ease of printing, excellent adhesion to a variety of substrates, and overall economical raw material costs that can be extruded into cast and blown films, cast extruded directly onto substrates, cross head extruded to coat yarns, and formed into a fibers and other thin cross sections for use in end use applications such as automotive interiors, wall coverings, upholstery, advertising banners and films, tenting, coated yarns and coated yarn fabrics, window treatment fabrics, and floor coverings as replacement materials where flexible PVC is used in those same applications. In particular, such elastomeric polyolefin compositions and the resultant end use film, fiber, yarn, coated or laminated scrim or fabric onto which they are adhered must be able to pass standard industry or regulatory flame retardant, smoke density and toxic off-gassing tests with ease. Additionally, such composition should impart high levels of outdoor weathering performance, be easily colored through the use of additive pigments common to the use of polyolefins, while providing ease of recycling and have no toxicity to the environment or living organisms.

Therefore, in accordance with the present invention, there are provided elastomeric polyolefin compositions that when melt extruded using a cross head die, cast or blown film die either as single or multilayer film constructions or said films are extruded directly onto a fabric, yarn or other substrate the resultant extrusion coated construction or stand alone film(s) will meet or exceed certain industry specific or regulatory flame retardant, smoke density, and toxic off-gassing requirements while maintaining all of the aforementioned desirable end use properties and economics outlined previously.

In the case of elastomeric polyolefin compositions that require flame retardant properties or the imparting of flame retardant properties to the overall construction in which the flame retardant elastomeric polyolefin composition is used (e.g., cast films extrusion coated onto fabrics and/or scrims), the preferred flame retardant chemical additive system added and used in the composition should work by a synergistic vapor phase mechanism. It is well known to those skilled in the art that most vapor phase flame retardant systems used for imparting flame retardant properties to non-elastomeric polyolefin compositions are halogenated and most preferably brominated cyclic or aliphatic organic molecules with sufficient molecular weight to maintain their heat stability when exposed to multiple heat histories from the extrusion processing temperatures during their incorporation into a final composition and article. In this invention we deal with elastomeric polyolefin compositions that are formulated with a range of lesser to greater degrees of elastomeric properties and it is found that certain brominated organic species impart a lesser to greater degrees of flame retardant properties to the elastomeric polyolefin compositions in which they are added. Also, as is well known in the art, the use of antimony trioxide is often added to non-elastomeric polyolefin compositions (in a ratio of about 3 parts brominated flame retardant species to 1 part antimony trioxide species by weight) as a vapor phase flame retardant synergist, improving the flame retardant properties of the non-elastomeric polyolefin compositions in which they are used in combination with the chosen brominated flame retardant species. Surprisingly, the use of antimony synergists are not as effective when used in conjunction with the brominated flame retardants chosen to flame retard the elastomeric polyolefin compositions found in the following embodiments. What is found to be more preferred regarding the choice of a "synergist" to be used in the presence of the brominated organic flame retardants to flame retard the elastomeric polyolefin compositions while maintaining or achieving the other important properties outlined previously in the examples given is the choice to use concentrations of certain hypophosphorous acid metal salts having the general formula:

$$(PH_2O_2)_n Me$$

where Me is the metal atom belonging to the groups I, II, III, and IV of the periodic table of the elements. In this approach, it was found that using the hypophosphorous acid metal salts in combination with certain brominated flame retardant species instead of choosing an antimony synergist resulted in a surprising range of elastomeric polyolefin compositions that were easy to extrusion process and allowed for the retention or impartation of the inherent or imparted mechanical, optical, melt adhesive and surface properties of the polyolefins in which they were used. Additionally, it will be shown that elastomeric polyolefin compositions formulated with this flame retardant approach can impart the flame retardant properties of the composition to the substrate as well which is evidenced by the data of the examples to follow. Coated fabrics or other articles made with the flame retardant elastomeric polyolefin compositions are easily recycled and said compositions are ideal as cost effective, environmentally sustainable, alternative polymers and even direct functional replacements for flexible PVC as it is used in end use applications such as automotive interiors, wall coverings, upholstery, advertising banners and films, tenting, coated yarns and coated yarn fabrics, window treatment fabrics, juvenile care fabrics and bedding, medical bedding, and floor coverings.

In accordance with the present invention, various embodiments are provided for use in formulating elastomeric polyolefin compositions, a single or blend of polyolefin polymers is chosen and thusly modified through the addition of various flame retardants, processing aids, surface modifiers, ultraviolet light inhibitors, antioxidants, and other additives and colorants through the use of twin screw and single screw compounding extruders. The choice of the polyolefins and the amounts of each to use relative to the rest of the composition is critical as the final degree of flexibility and Shore hardness is important when trying to emulate the "hand" of flexible PVC especially as it relates to the final effect achieved when the elastomeric polyolefin composition is adhered to, or extruded onto, the final substrate of choice. Once the exact ratio of different unmodified polyolefin polymers is chosen with the appropriate additives and colorants, the polymers, chemicals and colorants are blended together typically through low cost, low intensity tumble blending or through some other low intensity method and then starve or gravity fed into the throat of the extruder for melting, mixing, and dispersion of the hot extrudate. The hot extrudate is then quenched typically by water bath quench tank, and the extruded strands are fed into a strand pelletizer or cutter, though face cut or underwater ring pellet cut systems will suffice in the alternative.

After melt extrusion compounding of the elastomeric polyolefin composition into pellets, the resultant thermoplastic olefin (TPO) compound, which is now a fully formulated resin system, can be fed into a variety of extrusion coating or film formation extrusion processes. These extrusion finishing processes can be cross head die extrusion onto a yarn or other substrate, cast film extrusion coating onto fabrics or scrims, cast film extrusion to form single or multilayered films, single or multilayered blown film extrusion processes or various profile extrusion processes to form more complex multifaceted profile shapes cut to a given desired length. What is found is that use of many of the elastomeric polyolefin compositions outlined in the examples yield easily extruded films, profiles. and other constructions that are flame retardant and meet regulatory or end use market flame retardant performance, and that such films, profiles and extrusion coated substrates have a very similar "hand" and other functional features of the flexible PVC counterparts that these constructions can be used to replace. Once more, the resultant elastomeric polyolefin articles produced have virtually undetectable levels of brominated species when the elastomeric polyolefin components are analyzed with modern analytical methods. When the final article (elastomeric polyolefin polymer coated onto substrate) or even just the elastomeric polyolefin polymer is tested by itself for flame retardant performance it is found that the total final construction, in many cases, has the final required flame retardant properties common to the end use applications (automotive interiors, wall coverings, upholstery, advertising banners and films, tenting, coated yarns and coated yarn fabrics, window treatment fabrics, and floor coverings) where flexible PVC is often used. Additionally it is observed that very low smoke densities and toxic off gassing results from the partial combustion that occurs in some of the flame retardant performance testing of the elastomeric polyolefin compositions and the end use products in which they are used. This last property is extremely important for a variety of applications such as aerospace applications, interior office applications, mining and interior residential applications where time of egress is an important element to occupants having the time to escape a burning building or room where flexible PVC articles are so commonly in use but now their replacement material saves lives.

DETAILED DESCRIPTION OF THE EXEMPLARY EMBODIMENTS

The elastomeric polyolefin compositions that achieve high levels of flame retardancy, ease of processing, lower extrusion and down stream conversion costs, little to no toxic off-gassing, low smoke density during combustion, excellent mechanical properties, desirable hand characteristics and flexibility, ease of printing, excellent adhesion to a variety of substrates, and overall economical raw material costs that can be extruded into cast and blown films, cast extruded directly onto substrates, cross head extruded to coat yarns, and formed into a fibers and other thin cross sections for use in end use applications such as automotive interiors, wall coverings, upholstery, advertising banners and films, tenting, coated yarns and coated yarn fabrics, window treatment fabrics, and floor coverings as replacement materials where flexible PVC is used in those same applications comprise a major amount of a highly ethylene modified heterophasic polypropylene co-polymers (reactor TPO) or blend thereof with polypropylene homopolymers or other flexiblized, elastomeric polyolefin, a minor amount of an organic brominated flame retardant, a flame retardant synergist comprising a hypophosphorous acid metal salts having the general formula:

$$(PH_2O_2)_n Me$$

where Me is the metal atom belonging to the groups I, II, III, and IV of the periodic table of the elements, processing aids, a viscosity modifier, surface modifiers, and other inorganic or organic fillers with or without colorants.

Elastomeric means that a more rubbery, less crystalline, polyolefin or blends of polyolefins are present in the blend of the composition. In general, the more elastomeric the composition is then the softer it is to the touch ("soft hand"), the more flexible it is, the greater the impact strength is and the lower the service temperature of the composition.

The "blend" of the composition includes all the polyolefins, chemical additives, and colorants chosen to comprise the elastomeric polyolefin composition. Polyolefins are polymers derived from propylene, ethylene, butane, isobutene, pentene, hexane, heptene, octane, 2-methylpropene, 2-methylbutene, 4-methylpentene, 4-methylhexene, 5-methylhexene, butadiene, pentadiene, hexadiene, isoprene, 2,3-dimethylbutadiene, vinylcyclohexene, cyclopentadiene, styrene, methylstyrene, corresponding copolymers, co-polymers containing an olefinic carboxylic acid or anhydride, or ester selected among acrylic acid, maleic anhydride, vinyl acetate, homopolymer blends, copolymer blends, co-polymer blends and homopolymer-copolymer blends, preferably selected among polypropylene including atactic-, syndiotactic-, and isotactic-polypropylene, polyethylene including low density, high density, linear low density and block and random copolymers of ethylene and propylene.

The starting, unmodified polymers used in the elastomeric polyolefin compositions of the present invention are often referred to in the art as a thermoplastic olefin (TPO). The term TPO as it is used here are physical blends of an unmodified polypropylene homopolymer(s) or co-polymers and/or an elastomeric polyolefin elastomer. In the case of the use of polypropylene homopolymers and co-polymers, the propylene portion of the polymeric chains are most commonly iso-tactic isomers of the polypropylene polymers as opposed to atactic or syndiotactic, although these less used isomers of propylene homo- and co-polymers can be used as well. if available. There are several elastomeric polyolefin polymers to choose from and the higher the concentration of the addition of the elastomeric polyolefin to the polypropylene homopolymer or co-polymer will lead to higher and higher degrees of flexibility (lower and lower degrees of flexural modulus) and lower Shore hardness so as to achieve a final blend of polymers that begin to approximate the hand and functionality of the flexible PVC composition to be replaced. Of the different kinds or grades of elastomeric polyolefins to choose from are two types in particular that are most useful. First, there are the earlier elastomeric polyolefins that were developed over 20 years ago and offered predominately by Exxon Mobil and Dow Chemical and these are essentially mettalocene catalyzed elastomeric grades of low density polyethylene. Often marketed as "plastomers" or polyolefin elastomers (or "POE's"), they are known for being very chemically and morphologically compatible with a range of grades of polypropylene and polyethylene non-elastomeric homo- and co-polymers when physically blended and extruded together to form a final polyolefin blend. Plastomers are also characterized by their very low specific gravity relative to other kinds of thermoplastic polymers, often exhibiting a density of less than 0.90 grams per cubic centimeter. The second choice of an elastomeric polyolefin to use to blend with non-elastomeric polyolefins in an effort to achieve lower Shore hardness and higher degrees of flexibility or low flexural modulus are the elastomeric poly-propylene/ethylenes co-polymers, sometimes termed "reactor TPO's". Reactor TPO's are highly ethylene modified heterophasic polypropylene co-polymers and they are elastomeric. Reactor TPO's are available in several different grades from Equistar/Lyondell-Basell Advanced Polymers under the trade names "Adflex" from Dow Chemical and "Versify" from Equistar/Lyondell/Basell. Blending such elastomeric co-polymers with other non-elastomeric polyolefin homo/co-polymers yields the resultant blend of polymers with an elastomeric more flexible polymer blend with improved impact properties and higher degrees of flexibility as well. Polypropylene homo-polymers are not considered to be elastomeric as they are too crystalline and do not have the degree of molecular (site specific) architecture to allow the polymer to have any significant recovery from mechanical deformation. In the present invention Thermoplastic Olefins (TPO) that have the appropriate ratio blend of both the polyolefin elastomer polymer(s) described above and non-elastomeric polyolefin homo/co-polymers to impart the desired flexibility and Shore hardness and all of the additives, colorants and other additive modifiers added to it so that it is fully modified with such colorants and additives to impart the degrees of other performance requirements (e.g., flame retardant properties, long term weatherability, color and appearance, ease of processing, etc.) as required to emulate or approximate the polyvinyl chloride compositions it is formulated to replace are called "Elastomeric Polyolefin Compositions". In general it will be desirable for the flexible, elastomeric polyolefin (the POE, reactor TPO or polypropylene/ethylene elastomer) to be present in an amount of at least 25% based on the total weight of the elastomeric polyolefin composition and the other polyolefin homo- or co-polymer(s) will comprise the balance of the recipe plus the other additives flame retardant, synergist, UV stabilizers, etc., and colorants. The ideal percentage of the flexible phase of the composition is actually determined by the degree or extent to which one wishes to adjust the Shore hardness of the composition, service temperature (cold crack temperature for example), flexural modulus (flexibility), and other mechanical properties in an effort to mimic the look, feel and mechanical functionality of the flexible PVC which is to be replaced in a given application. It is possible to have compositions that contain no polypropylene homopolymer(s) present and simply have an elastomeric polyolefin composition that only contains the POE, reactor TPO or other elastomeric propylene/ethylene polymer with the additives and/or colorants and still obtain the functionality of flexible PVC as a replacement material in a number of different end use applications.

The polyolefins chosen to be in the elastomeric polyolefin composition can have a range of melt flow rates or indices and corresponding molecular weight distributions as needed and available with the commercial grade of polyolefins to choose from. When choosing to blend an elastomeric polyolefin and other polyolefins, it is desirable to choose polyolefins that have similar melt flow rates or indices. Typically, the melt flow rates or indices of the polyolefins chosen to blend together should be within about 25% of one another. This allows further ease of extrusion processing at minimal extrusion processing temperatures.

Of the flame retardants preferred for appropriately flame retarding the elastomeric polyolefin composition are the halogenated organic aliphatic, aromatic and cyclic. In particular the brominated organic flame retardants should be selected such as decabromodiphenyl oxide, hexabromocyclododecane, ethylene bistetrabromophthalimide, tris(tribromoneaopentyl)phosphate, adducts of hexachloropentadiene and cyclo octadiene and tetrabromo bis phenol A bis(2,3,-dibromopropyl ether) with an antimony oxide synergist, with more preferably tetrabromo bis phenol A bis(2,3,-dibromopropyl ether) and most preferably substituting the antimony oxide synergist with instead a flame retardant synergist comprising a hypophosphorous acid metal salts having the general formula:

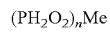

$(PH_2O_2)_n Me$ where Me is the metal atom belonging to the groups I, II, III, and IV of the periodic table of the elements. Of the preferred metal atoms of this hypophosphorous acid metal salt are calcium and aluminum. Surprisingly, choosing this most preferred flame retardant and flame retardant synergist allows the formulator to obtain excellent flame retardant properties with exceedingly low levels of flame retardant additives required in the resultant extruded elastomeric polyolefin compositions especially when such compositions are melt extruded via cast or blown single or multilayer films, films cast extruded directly onto substrates such as fabrics or scrims, profiles of various dimensions and shapes that may be cut periodically into useful lengths, and extrusions through a cross head die to coat yarns and other substrates that can be used for weaving or knitting into useful fabrics. Even more surprising is the plethora of different end use properties that are possible with the use of this most preferred flame retardant system and the resultant elastomeric polyolefin compositions that mimic the functionality, look and hand of flexible PVC or other flexible polymers that have been historically common to end use applications such as automotive interiors, wall coverings, upholstery, advertising banners and films, tenting, coated yarns and coated yarn fabrics, window treatment fabrics, floor coverings, juvenile care products like fabrics used in the constructions of juvenile bedding, cribs, blankets, clothing, seating, and play pins. The amount of brominated organic flame retardant required for the elastomeric polyolefin composition to obtain excellent flame retardant properties is typically an order of magnitude lower (0.2% to 1.0% or more based on the total weight of the composition) with the hypophosphorous acid metal salt added at a 6:1 and more preferably 3:1 ratio relative to the brominated organic flame retardant. Most interesting is the fact that single layer and multilayer blown and cast films, films cast extrusion coated on fabrics, extrusion coated yarns and extruded profiles having shore A hardness of 50 to 96 or more that yield soft, pliable end use fabrics mimicking the hand and functionality of flexible PVC coated fabrics and yarns can be obtained with the end use application of these elastomeric polyolefin compositions.

Care must be taken in the choice of internal and external lubricants as adding too much of a lubricant or choice of certain lubricants to the composition can result in migration of the species to the surface of the composition after it has been formed into its final article and aged. Making a poor choice of certain lubricants or using too high a concentration of an internal or external lubricant is evidenced by the fact that poor printing properties may be obtained when the elastomeric polyolefin composition in its end use application is printed upon. As many of the existing and traditional end use applications of flexible PVC are used for decorative purposes, printing on the film, coated or woven fabric can be an important requirement. Therefore, sparing use (0.20% or less based on the compositions total weight) of traditional metallic soap (fatty acid salts) like high levels of zinc, calcium, sodium or aluminum stearate is preferred. Also, sparing use (0.10% or less) of the other potentially migratory lubricant species or dispersants is advised to avoid such interference with printing of the surface of obtained and formed elastomeric polyolefin compositions.

Polyoleofinic oils (white mineral oils, Napthenic oils, branched alpha-olefin oils, etc) can be employed in the formulation of the elastomeric polyolefin compositions in order to obtain various end use properties and effects. Care must be taken in the selection of a potential processing oil as there are very few compatible oils that have the environmentally sustainable profile that will pass muster with the various "green initiatives" or "sustainability indices" that are being established by end use retailers or other commercial consumers. What is of concern here is that certain compatible oils by their very nature when compared to polyolefins are of the same basic chemistry except in the area of molecular weight, because oils are, by definition, of a much lower molecular weight compared to their polymeric cousins volatility can be of a major concern. Process or plasticizing oils that migrate to the surface of the composition after incorporation can cause of number of problems in the same way that lubricants can be of concern. Their migration to the surface of the elastomeric polyolefin composition can interfere with printing fastness of any inks, dyes, or colorant that are used to print on the surface of the composition resulting in the inks smearing or running after such a time that the inks were supposed to be set. Also, migratory napthenic oils can result in unwanted "volatile organic compounds" (VOC's) off-gassing at room temperature or elevated temperatures which can be of a concern when the elastomeric polyolefin compositions are used for indoor end use applications (eg. Interior office applications). A major complaint in regards to the use of flexible PVC is that the plasticizers used to plasticize PVC can often contribute to the an end use product's VOC profile and in attempting to provide flexible PVC replacement materials through the development and use of these elastomeric polyolefin compositions one would not want to solve one problem (eliminating the use of flexible PVC for a given end use application) only to create another (replacing it with an alternative elastomeric polyolefin composition that contains a volatile organic oil and therefore possible continued reportable VOC's). Therefore it is important to choose a "non-migratory" plasticizing oil that has been found to work well in these compositions, such as the most preferred "Elevast" from Exxon-Mobil. Another consideration in the choice(s) of internal oils used for their processing benefits and plasticizing effects is their effect on the flame retardant properties of the composition. The addition of even a small amount of an organic oil can render poor to very poor flame retardant performance even with elevated concentrations of the any of the preferred or most preferred flame retardants outlined.

UV stabilizers can be added to the elastomeric polyolefin composition in an amount of about up to 2.0%. Appropriate UV stabilizers are various hydroxybenzopenones, hydroxybenzotriazoles, and monomeric and oligomeric hinderedamine light stabilizers with tertiary oligomeric hinderedamine derivatives as the most preferred approach in a 3:1 ratio by weight with hydroxybenzophenones or hydroxybenzotriazoles for maximum ultraviolet light protection.

Common pigments known to those skilled in the art that can be used to properly decoratively colorize the elastomeric polyolefin composition include both inorganic and organic pigments known for their use in coloring polyolefins through blending them in the appropriate proportions and dispersing the pigments into the molten polyolefin via a higher shear extrusion process. Inorganic pigments such as titanium dioxide, iron oxide, carbon black, zinc ferrite are some of the pigments known to work well. Organic pigment choices include the copper phthalocyanine pigments known for their rich blue and green shades and the quinacridone, perylene, nigrosine and anthraquinones all of which allow one to achieve any and all desired custom colors that may be desired when they are properly dispersed and formulated to achieve the shade of choice. Standard color match techniques can be employed as would be used to achieve a desired color composed of a mix of inorganic and organic pigments with care to avoid pigments known to be comprised of heavy metals such as the lead chromates and chrome molybdates which are perceived and considered to be less environmentally friendly and of a questionable toxicological profile for use in an environmentally friendly end use applications of the elastomeric polyolefin compositions. Also, particle size and properly dispersion of any pigments used can become critical as melt extruded thin films or melt thin extruded thin film coating are possible with these compositions and it can be important to use what is termed in the art "film grade" and/or "fiber grade" pigment dispersions that are typically characterized as pigment dispersions that have an average particle agglomerate size of 5 to 10 microns once dispersed in a polyolefin carrier resin. This can prevent unwanted pin holes or surface imperfections that can be the result of over sized pigment particle agglomerates that can protrude through the surface of a thin gauge film.

Common inorganic mineral fillers known in the art for addition to polyolefins are all candidate materials that can be added to the composition from 0% to as much as 80% or more based on the total weight of the composition. Micronized inorganic mineral fillers known to be employed include calcium carbonate, barium sulfate, talc, etc. Inorganic mineral fillers can be employed to formulate the elastomeric polyolefin composition but care must be taken as it has been observed that most inorganic fillers are alkaline in nature or contain alkaline contaminants that will effectively deactivate the aforementioned most preferred, highly efficient flame retardant, if flame retardant properties are required. Whether flame retardant properties are desired or not, the use of certain inorganic mineral fillers can result in an unexpected and surprising result in that the use of certain fillers helps to increase the density of the elastomeric polyolefin composition resulting in a "hand" that is even more reminiscent of flexible PVC due to achieving relatively equivalent specific gravities of the filled elastomeric polyolefin composition and a typical flexible PVC. For example, a typical unfilled elastomeric polyolefin composition might have a specific gravity of approximately 0.95 and a flexible PVC composition that it is meant to replace might have a specific gravity of 1.40. The addition of higher levels (say, 40% by weight) of a barium sulfate mineral filler will increase the overall specific gravity of the elastomeric polyolefin composition to about 1.38 which approximates the specific gravity of the flexible PVC one is trying to replace for a given end use application. Provided that the flexibility and Shore hardness of the elastomeric polyolefin composition has been formulated to approximate the flexibility and Shore hardness of the flexible PVC then the additional emulation of the density results in an elastomeric polyolefin composition that "feels to the touch" almost identical to the flexible PVC that it is meant to replace. This is because the specific gravities of the composition and the flexible PVC are about the same. One must be aware, though, that this technique can be challenging as it is subjective in nature and as stated previously, the flame retardancy can be negatively affected when employing the use of mineral fillers as there are often trace impurities that can deactivate the flame retardant system of preference.

Other fillers may be employed that fall outside the classification of mineral fillers, and these are fibrous or spherical in nature. These include the glass, aramid, glass microspheres, etc. The use of these non-mineral fillers is typically from only a few percent to as much as 50% by weight based on the total weight of the elastomeric polyolefin composition. However, the use of non-mineral fillers in the elastomeric polyolefin compositions should be precluded for most film, fiber or other thin gauge applications, as particle size or fiber length is not compatible with these end use geometries. However, these non-mineral filler systems may be employed in compositions that will tolerate and benefit from their use, e.g., elastomeric polyolefin compositions used for profile extrusions and the like. Once again, attention to the alkalinity is important, as too alkaline fibrous or spherical fillers can deactivate the preferred flame retardant if flame retardant properties are desired and formulated into the elastomeric polyolefin composition. In the preferred embodiment, a filler having a pH of 7.0 or less has been found not to have an adverse effect on the flame retardancy of the elastomeric polyolefin composition.

Anti-drip fluorinated polymer additives may be employed up to about 1.0% based on the total weight of the elastomeric polyolefin composition. These are typically employed to reduce or eliminate flaming drip behavior that can sometimes be observed in certain vertical flame retardant performance tests where flame drips are not tolerated in order to pass the test.

A method preferred to prepare a chemical additive concentrate or masterbatch for use in the final preparation of the elastomeric polyolefin composition includes the use of a twin screw extruder, and more preferred a twin screw, co-rotating extruder. Typically, all of the polyolefin carrier resin, pigments, fillers and other additives (preferred flame retardants, UV stabilizers, antioxidants, surface modifiers, processing aids, etc.) are combined into a low intensity mixer and randomized such as would occur in the use of tumble blender or ribbon blender. This prepares the "pre-mix" for twin screw extrusion compounding. An alternative, and more preferred, method is the use of a multi-station gravimetric blender that weighs out each component automatically employing the use of microprocessor computer controls and load cell technology commonly known to one skilled in the art. After the chemical additives are weighed and blended or weighed and combined in the more preferred alternative approach using a gravimetric blending station, the proper concentration of the polyolefin carrier resin compatible with the overall elastomeric polyolefin composition is metered as well by the same technique in such a way that both are fed simultaneously into the throat of the extruder using starve feeding techniques known to those skilled in the art. The twin screw extruder then melts, mixes, and disperses the chemical additives into the carrier resin at high speed and intensity. Very fine dispersions can be obtained in this way provided that the total concentration of the additives is kept at 50% or less by weight of the pre-mix. These fine dispersions are particularly necessary when the final application requires the end use extrusion processing of cast or blown films or cast film extrusion onto a substrate such as yarns, fabrics, or scrims. The twin screw extruder will then extrude the extrudate in the form of strands that can be water quenched and fed into a pelletizer where the strands are cut at high speed into usable, free flowing pellets. The resultant "additive concentrate" or "masterbatch" can then be added at the required percentage, provided that it has been properly formulated to do so (usually resulting in it being added at 10% to 25% by weight) to the appropriate blend of Reactor TPO, Propylene/ethylene copolymers, POE's and/or polypropylene copolymers or homopolymers in the desired ratios in order to achieve the final elastomeric polyolefin composition pre-mix. The blending of the elastomeric polyolefin pre-mix resins with the additive masterbatch/concentrate can occur with a low intensity mixer as described above or more preferable using an automated gravimetric multi-station blender as was used above to make the additive concentrate or masterbatch and gravity fed into a single screw extruder designed for melt compound processing polyolefins. The resultant extrudate comprises the elastomeric polyolefin composition and this is then water quenched in strand form and fed into a pelletizer for cutting into free flowing, dried pellets. These pellets are then ready to be packaged, shipped and received by the end use processor who will then convert them using a number of end use processes outlined below.

In the cases where the end use applications require the manufacture of a single layer or multilayer film that will be used alone for printing, embossing, and/or stand alone use with no further need to adhere such films to another substrate then blown film, calendaring, or cast film extrusion manufacturing techniques may be employed. Typically what takes place in all these film formation processes is the elastomeric polyolefin composition in pellet form is fed into the throat of a single or in some cases twin screw extruder, melted, mixed and then extruded into a film that is forced through a annular die, in the case of blown film, or slit die, in the case of cast film, or fed to an inverted L-shaped calendar where it is formed into a film of non-varying gauge. In all film formation processes the process to form the films made from the elastomeric polyolefin compositions is the same as would be used to process regular unmodified polyolefins. In the case of a blown film, the hot film formed is cooled to a solid state by the air ring around the annular die and the film is taken up as a bubble, cooled and lifted by the air that forms the bubble, and laid flat to form a roll of film at take up. In the case of cast film extrusion processing, the film is formed via a slit type die and the film is immediately passed into a chill roll or rolls where the film is rapidly cooled. The chill rolls may have embossing patterns in them to impart a pattern into the film as desired. The film is then edge trimmed and/or cut into uniform tapes if desired and then taken up on packages or rolls. The least preferred method of film formation is through the use of an inverted L-shaped calendar where the composition is typically masticated with a milling process, banbury mixer or some other kind of heated and shear process and the hot polymer mass is fed to the calendar rolls where it is formed into a film of minimal gauge variation. All of the resultant films may then be processed downstream where they may be cut, printed, embossed, and/or laminated onto other substrates such as fabrics and other scrims in a separate step. Films made from elastomeric polyolefin compositions of this invention will have similar look, feel, and functionality as flexible PVC films of the same thickness and may be used as replacement materials when a more environmentally sustainable alternative is desired. These films may be used for various end use applications such as shower curtains, automotive interiors, wall coverings, upholstery, advertising banners, and films, tenting and awnings.

Cast film melt extrusion coating methods are most effective in forming films from the elastomeric polyolefin compositions that are directly coated onto fabrics, scrims or other substrates. This most preferred method of conversion of elastomeric polyolefin compositions into end use applications to replace flexible PVC is important to consider as it allows film formation to occur followed by immediate application of the hot film onto a given substrate which may be nonwoven fabrics or paper, woven fabrics, knitted fabrics, or other scrims. The hot film, while adhered to the substrate, is immediately chilled to a solid uniform film geometry and the chill roll can have an embossing pattern to impart desired surface pattern or texture and as such saves the extra step and expense of embossing and laminating the film onto a substrate as occurs when the film is wholly formed first but not adhered directly to a substrate. It should be noted that it is not as common occurrence to extrusion process flexible PVC films using an extrusion coating methodology as flexible PVC does not behave predictably when processed using this technique. Therefore, it is a major cost advantage when elastomeric polyolefin compositions described in this specification are used to produce end use applications using the extrusion coating process to replace flexible PVC in the same end use applications. The final extrusion coated fabrics using this methodology may be used for various end use applications such as juvenile bedding and children's quick clean up fabrics, shower curtains, automotive interiors, wall coverings, upholstery, advertising banners and films, tenting and awnings, and acoustical wall panel coverings. Additionally, extrusion coated fabrics and other substrates made from elastomeric polyolefin compositions containing the preferred flame retardant using this approach can also be used quite effectively in commercial and private aircraft applications by themselves or formed into multilayered composite structures such as cargo bay liners, interior fuselage coverings, airplane interior upholstery and seating, trays, floor panels and underlayment and insulation blanket components.

Cross head die extrusion onto yarns and other linearly oriented substrate involves the elastomeric polyolefin composition being fed into a single or twin screw extruder and the extrudate being melted and mixed and forced via pressure into a cross head die where a yarn or some other linearly oriented substrate is passed through or onto the molten polymer which adheres to and/or around the surface of the yarn which is then passed into a water quench tank or sprayed mist which cools the polymer to a solid state. The coated yarn is then taken up via tensioners to a winder that winds the packages of yarn into a spool. The yarn can be extrusion coated this way using a single coating or simultaneous coatings so that a multi-colored striped yarn effect can be obtained for a more decorative effect. The coated yarns can then be woven, knitted or even needled into nonwovens for various end use applications including wall covering, window treatments, awnings, sling fabrics for furniture and other end use applications where monofilament or flexible PVC coated yarns are traditionally used.

Fiber formation processes can be used to further process the elastomeric polyolefin compositions for end use applications that require such an approach. The elastomeric polyolefin compositions can be fed into a single screw or twin screw extruder, melted, mixed and forced via pressure through a spinneret where fiber formation occurs and a plurality of filaments are formed and air or water quenched to form cooled filaments that are drawn over hot godet rolls and therefore oriented. Typical draw ratios to impart a high enough degree of orientation and therefore useful fiber or filament properties is about 3:1 or more. Formulations that have a higher degree of elastomeric properties can form filaments with 100% recovery or more once the filaments are fully drawn to maximum degree of orientation. This is most interesting when considering that formulation of the elastomeric polyolefin composition to have higher elastomeric properties and with the preferred flame retardant chemical additives can result in filaments that are flame retardant replacements for other synthetic rubber yarns or filaments (e.g., Spandex, polyisoprene, etc). If the filaments are extruded to smaller diameters (up to about 30 or 40 denier per filament after drawing) then the filaments are collected together into a single yarn and may be textured by various methods known in the art before take up with a winder onto a package. In the case of staple fiber extrusion processes the filaments may be collected in such a way as to form a tow where the filaments are drawn to orient them and the tow is fed into a cutter where they are cut into various staple lengths. Staple fibers made from fiber extrusion can be needled or otherwise formed into non-wovens that may be then used for useful scrims, underlayments, medical gowns, hygiene products, etc., with useful elastomeric and/or flame retardant properties. Filament yarns, or staple yarns that are formed from the ring, open end or friction spinning of staple fibers, can be woven, knitted, stitch-bonded, weft inserted knitted, or tufted into fabrics, non-wovens. and floor coverings that will have interesting properties that allow these end use applications to replace similar applications where flexible PVC and other polymers are currently used.

Extruded profiles or even sheets of the elastomeric polyolefin compositions where the composition pellets are fed into a single screw or twin screw extruder and the polymer is melted, mixed, and forced via pressure through a die into various multifaceted shapes where it is chilled with a water spray or bath and then cut periodically into useful lengths. The elastomeric polyolefin composition processed in this way can be used in a variety of end use applications including window and door profiles, window and door panels, interior office cubicle panels, automotive and truck firewall panels, automotive and truck undercarriage and panels, commercial and private aircraft airplane floor panels and spacers, automotive and truck floor panels and spacers, gap filler and profiles for commercial and private aircraft, commercial and residential wall panels.

The following examples are illustrative of the present invention and should not limit the scope of the invention. In the examples given, the additive and/or flame retardant concentrates were produced by weighing out the ingredients listed in each additive concentrate recipe and combining them with low intensity mixing (tumble blender, whirlwind mixer or the like) and then starve feeding the mixture into a high speed, high torque co-rotating compounding extruder. A heat profile starting at 160 degrees Celsius and gradually ramping to 200 degrees Celsius was employed. Care was taken to ensure that the revolutions per minute were kept under a certain maximum to avoid over-torquing the twin screw compounding line. The extrudate was then forced out of a strand die and the molten strands were directed into a water quench bath and fed to the end of the batch at a rate to ensure substantial cooling to ensure that they could then be fed into a strand pelletizing unit. The strands were then cut at a high rate of speed into pellets, classified by a vibrating classifier and deposited into a drum where they were cooled to room temperature. All remaining surface moisture was allowed to evaporate upon cooling in ambient atmosphere.

TABLE 1

| Component | Supplier | % |
|---|---|---|
| Additive Concentrate #1 | | |
| Sabostab 119 FL (Oligomeric Hindered Amine Light Stabilizer) | Sabo Chemicals | 4.00% |
| Cyasorb UV-3853 PP5 (Hinderd Amine Light Stabilizer) | Cytec Industries | 3.00% |
| Adflex V109F (12 MFR Reactor TPO) | Basell | 93.00% |
| Total: | | 100.00% |
| Additive Concentrate #2 | | |
| Armoslip CP (Oleamide Slip Surface Modifier) | Akzo Nobel | 5.00% |
| Sabostab 119 FL (Oligomeric Hindered Amine Light Stabilizer) | Azalea/Sabo | 4.00% |
| Cyasorb UV-3853 PP5 (Hinderd Amine Light Stabilizer) | Cytec Industries | 3.00% |
| Adflex Z108S (27 MFR Reactor TPO) | Basell | 88.00% |
| Total: | | 100.00% |

TABLE 2

| Component | Supplier | % |
|---|---|---|
| Flame Retardant Concentrate #1 | | |
| Aluminum Phosphinate | Italmatch | 22.00% |
| FR-720 (tetrabromo bis phenol A bis(2,3,-dibromopropyl ether) | Dead Sea Bromine Group | 3.25% |
| Perkadox 30 | Akzo Nobel | 1.00% |
| P603 Sunoco Polypropylene | Sunoco | 73.75% |
| Homopolymer Flake Total: | | 100.00% |
| Flame Retardant Concentrate #2 | | |
| FR-720 (tetrabromo bis phenol A bis(2,3,-dibromopropyl ether) | Dead Sea Bromine Group | 30.00% |
| Red Star (Antimony Trioxide) | Chemtura | 10.00% |
| P603 Sunoco Polypoprylene | Sunoco | 60.00% |
| Homopolymer Flake Total: | | 100.00% |
| Flame Retardant Concentrate #3 | | |
| FR-372 (tris(tribromoneopentyl) phosphate) | Dead Sea Bromine Group | 30.00% |
| Red Star (Antimony Trioxide) | Chemtura | 10.00% |
| P603 Sunoco Polypropylene | Sunoco | 60.00% |
| Homopolymer Flake Total: | | 100.00% |

A percentage of the additive and a percentage by total blend weight of the flame retardant concentrates were then added to the final blended combination of polyolefin polymers (the TPO polymer blend) yielding the final formulated mix which comprises the elastomeric polyolefin composition in its entirety.

Typical Example

Once the additive concentrate and, optionally, the flame retardant concentrate are combined with the polyolefin polymer(s) and other appropriate color or additive concentrates, the ingredients are blended using low intensity mixing (tumble blender, whirlwind mixer, etc.) and they are then gravity fed via a hopper into a single screw compounding extruder. The mix of pellets is then melted, mixed, and extruded such that the extrudate is dropped into a water bath in strand form. The hot strands are allowed to feed through the length of the water bath until they exit the bath and then fed into a pelletizing cutter where the stands are cut into pellets, classified and allowed to cool and dry through evaporative cooling in a drum. The drum of pellets is then emptied into another container where subsequent batches are then post blended together via low intensity mixing to form a uniform mix of pellets ready for end use melt extrusion processing. Each example given describes the end use, melt extrusion process used to form and shape the resultant elastomeric polyolefin composition and the results of the testing of such end use articles to determine the appropriateness to the end use of interest.

TABLE 3

| | Elastomeric Polyolefin Compositions | | | | | |
|---|---|---|---|---|---|---|
| Component | 1 | 2 | 3 | 4 | 5 | 6 |
| Additive Concentrate #1 | | | | | | |
| Additive Concentrate #2 | | 5.0% | 5.0% | 5.0% | 5.0% | 5.0% |
| Flame Retardant Concentrate #1 | 8.0% | | | | | 8.0% |
| Flame Retardant Concentrate #2 | | 28.0% | 28.0% | | | |
| Flame Retardant Concentrate #3 | | | | | 16.0% | |
| 70% Cimbar Baryte EX (1 micron Barium Sulfate) in Sunoco P-603 Carrier | | | 22.0% | 40.0% | | |
| 70% Titanium Dioxide (R-101 from DuPont) in Basell Z108S Reactor TPO | | | | | | |

TABLE 3-continued

Elastomeric Polyolefin Compositions

| | | | | | | |
|---|---|---|---|---|---|---|
| Off White Custom Color Concentrate (Blend of Organic and Inorganic Pigments dispersed in Sunoco P603 Resin) | 5.0% | 5.0% | 5.0% | | 5.0% | 5.0% |
| 45% Elevast A-80 (from Exxon-Mobil) Olefinic Oil Concentrate in P603 Polypropylene Carrier | | | | 10.0% | | |
| 30% Glass Filled Polypropylene from Washington Penn | 45.0% | 45.0% | 40.0% | 20.0% | 45.0% | |
| Engage 8407 (30 MFI metallocene catalyzed low density polyethylene elastomer (POE - Polyolefin Elastomer) | | | | | | |
| Basell Adflex Q100F (0.6 MFR - Reactor TPO) | | | | | | |
| Basell Adflex V109F (12 MFR - Reactor TPO) | | | | | | |
| Basell Adflex Z108S (27 MFR - Reactor TPO) | | | | | | 65.0% |
| Dow Versify 3300 (8 MFR Propylene/ethylene Elastomer) | | | | | | |
| Dow Versify 3401 (8 MFR Propylene/ethylene Elastomer) | | | | | | |
| Sunoco P603 Polypropylene Homopolymer | 42.0% | 17.0% | | 25% | 29.0% | 17.0% |
| Total(s): | 100.0% | 100.0% | 100.0% | 100.0% | 100.0% | 100.0% |
| Geometric Form of Extrusion | Cast and Cross Head Extrusion Coatings | Cross Head Extrusion Coating | Cross Head Extrusion Coating | Cross Head Extrusion Coating and Extrusions | Cross Head Extrusion Coating | Cross Head Extrusion Coating |
| Type of Substrate Coated | Yarns and Fabrics/Scrims | Yarns | Yarns | Yarns | Yarns | Yarns |

| | Example 1 | Example 2 | Example 3 | Example 4 | Example 5 | Example 6 |
|---|---|---|---|---|---|---|
| Flame Retardant Performance Tests | | | | | | |
| NFPA-701 (All Years) | Fail | Pass | Fail | Fail | Pass | Pass |
| CPAI-84 (All Years) | Fail | Pass | Fail | Fail | Pass | Pass |
| ASTM E84 Class A Rating | Fail | Pass | Fail | Fail | Pass | Pass |
| FMVSS 302 | Fail | Pass | Fail | Fail | Pass | Pass |
| State of California Title 19 | Fail | Pass | Fail | Fail | Pass | Pass |
| State of California Tech Bulletin 133 | Fail | Pass | Fail | Fail | Pass | Pass |
| FAR 25.853 Appendix F, Part I (Aerospace) | Fail | Pass | Fail | Fail | Pass | Pass |
| NBS Smoke Density | High | Medium | High | High | Medium | Low |
| Shore A Hardness | 88 | 88 | 90 | 80 | 89 | 89 |
| Property Ratings Replacement Index Key: 1 = Poor, 2 = Fair, 3 = Good, 4 = Very Good, 5 = Excellent, Max = 25 | | | | | | |
| Mechanical Properties in Machine Direction | 3.0 | 3.0 | 3.0 | 4.0 | 4.0 | 5.0 |
| Mechanical Properties in Cross Machine Direction | 3.0 | 3.0 | 3.0 | 4.0 | 4.0 | 5.0 |
| Hand and Flexibility | 4.0 | 4.0 | 4.0 | 5.0 | 4.0 | 5.0 |
| Retention of Mechanical Properties after Accelerated Weathering | 1.0 | 4.0 | 4.0 | 4.0 | 4.0 | 5.0 |
| Discoloration after Accelerated Weathering (1 = Very Poor, 5 = Excellent) | 1.0 | 3.0 | 4.0 | 4.0 | 1.0 | 5.0 |
| Totals: | 12.0 | 17.0 | 18.0 | 21.0 | 17.0 | 25.0 |

Example 1

The resultant elastomeric polyolefin composition was melt extrusion processed using two end use processes. First, a portion of the composition was fed into the hopper of a single screw extruder, melted with an escalating heat profile from 160 degrees Celsius to 210 degrees Celsius, mixed and then forced via pressure through the head of a cross head die where 4 ends of 1000 denier polypropylene multifilament yarns was being fed through the die at slower speeds than required due to noted surging of the extruder that was thought to have come from the polymer composition generating too much internal shear during the melt extrusion process. The yarn was fed at a rate that allowed the yarn to be completely coated by enough polymer such that when the yarns were water mist cooled and taken up by a winder, the thickness of the yarn was 0.030 inches in diameter. The coating of the polymer composition on the yarn was observed to be non-uniform and inconsistent with noted "beading" of the polymer along the surface of the coated yarn. This is an important and difficult problem to overcome as it results in the traverser of the high speed package winder from smoothly and evenly laying down the yarn onto the tube in a consistent manner and can result in winding the package of coated yarn at an unacceptably slow speed forcing the entire continuous coated yarn process to be slowed down as well. The highly irregular surface of the coated yarn can not be easily beamed and woven in the next steps as a coated yarn with a bumpy surface inhibits that surface of the yarn from moving smoothly at high speed through thread guides, heddles, and over other metal surfaces associated with the down stream textile processing (creeling, beaming, weaving, tentering, etc.) of the coated yarn. Nevertheless, the individual yarn ends were then taken up at the slower speed necessary on individual packages of yarn and the packages of yarn were then collected, placed on a creel and beamed at an unacceptable rate due to the bumpy coated yarn from becoming snagged on and across metal surfaces. The beam was then mounted on a Sulzer projectile loom where similar packages of coated yarn were used as fill yarns and the loom was used to produce a plain weave of coated yarn fabric. The fabric was then tentered in an oven at about 120 degrees Celsius and fed at a rate to insure that the polymer was slightly fused to insure that the woven pattern was locked into place after cooling. Three inch by eight inch fabric swatches were then cut form the roll of fabric, conditioned and tested via the vertical and horizontal battery of flame retardancy tests. A small portion of fabric was cut into specimens and tested via the NBS smoke density test. The test results were recorded. It was found that in every test the coated yarn fabric failed the flame retardancy tests and the smoke density was unacceptably high. The poor flame retardancy results indicated that the Dow Engage 8407 polyolefin elastomer (POE) performed poorly when the most preferred hypophosphorous acid metal salt catalyzed brominated flame retardant was employed to impart flame retardant properties to the elastomeric polyolefin composition when processed to produce cross head extrusion coated yarns and fabrics woven from such coated yarns. This is surprising, as Costanzi teaches the use of certain synergistic mixtures of hypophosphorous acid metal salts and halogenated organic compounds for flame retarding a number of polyolefin molding compositions and one would think that based on this prior art that the use of this flame retardant system would apply to coated yarn applications in United States patent publication number US2008/0214715, yet it clearly does not. Evidently, use of the synergistic flame retardant compositions described by Costanzi do not flame retard elastomeric polyolefin compositions containing significant concentrations of mettalocene catalyzed low density polyethylene elastomers such as Dow's Engage brand and Exxon Mobil's Exact.

Even though the resultant coated yarns and coated yarn fabrics had acceptable mechanical properties, the look and hand of similar flexible PVC coated yarn fabrics of similar weight and construction, the coated yarn fabrics were unacceptable due to the complete absence of any flame retardant properties and complete inability of the fabrics to pass the required commercial flame retardant specifications listed in the table (NFPA 701, CPAI 84, California Title 19 and NBS Smoke Density performance tests). Also, the absence of a ultraviolet light stabilizer and antioxidant system in the composition resulted in poor retention of mechanical properties and excessive discoloration (yellowing) after exposure to 2000 hours in a QUV accelerated weatherometer using a 340 nanometer light source. Based on the results of the physical testing, flame retardant testing and the accelerated weathering, it was determined that the polypropylene core yarn coated with the elastomeric polyolefin composition and the fabrics made thereof would have extremely limited utility and almost no commercial utility for use as commercial and residential wall covering, floor coverings, window treatments, labels and signage, seating and sling fabrics and bedding where passing common flame retardant performance specifications, such as NFPA-701 and California Title 19, are required in order to be able to sell coated yarn fabrics in the various aforementioned end use applications.

In the second attempt to melt extrusion process the elastomeric polyolefin composition of Example 1, the pellets were fed into the hopper of a single screw extruder, melted with an escalating heat profile from 200 degrees Celsius to 260 degrees Celsius, mixed and then forced via pressure through a slit shaped die mounted above the surface of a 60 inch wide, 2 ounce per square yard polypropylene, point bonded, spun bond scrim. After the polymer made contact with the scrim, it was immediately cooled via an embossed chill roll mounted in such a way as to make direct contact with the surface of the molten film now adhered to the face of the scrim. Because the polymer did not form a uniform extrusion coating on the surface of the scrim fabric the polymer was not uniformly cooled and the embossing pattern was imparted unevenly to the surface of the polymer. The extrusion coated fabric was then fed through a series of accumulators and guide rolls and then taken up on a tube. The extrusion coated fabric had acceptable initial mechanical properties and low odor. Flame retardant tests were performed on swatches and the poor flame retardancy results obtained indicate, once again, that Costanzi's prior art claims in United States Patent Publication No. US2008/0214715 wherein the use of certain synergistic mixtures of hypophosphorous acid metal salts and halogenated organic compounds for flame retarding a number of polyolefin compositions do not apply in this polyolefin composition and its use in cast extrusion coated fabric end use applications. Therefore, the failure of the use of Costanzi's flame retardant approach indicated that the Dow Engage 8407 polyolefin elastomer (POE) performed poorly overall. Therefore, as in the case of the elastomeric polyolefin composition coated yarn woven sample of Example 1, the extrusion coated fabric sample produced would have extremely limited utility and very poor commercial viability for use as automotive, wall covering, floor coverings, window treatments, labels and signage, seating, upholstery and sling fabrics, and bedding where flame retardant properties are required.

Example 2

As indicated in Table 3, Example 2, the elastomeric polyolefin composition was melt extrusion processed to produce a coated yarn and coated yarn fabric. First, a portion of the elastomeric polyolefin composition was fed into the hopper of a single screw extruder, melted with an escalating heat profile from 160 degrees Celsius to 210 degrees Celsius, mixed, and then forced via pressure through the head of a cross head die where 4 ends of 1000 denier polypropylene multifilament yarns was being fed through the die at high speed. The yarn was fed at a rate that allowed the yarn to be completely coated by enough of the elastomeric polyolefin composition such that when the coated yarns were water mist cooled and taken up by a winder, the thickness of the yarn was 0.030 inches in diameter. The coating of the polymer composition on the yarn was observed to be uniform and consistent with no "beading" of the polymer along the surface of the coated yarn. This is an important and difficult property to achieve as the polymer needs to coat the yarn evenly to insure further ease of downstream processing such as winding, beaming, and weaving. The individual yarn ends were then taken up at high speed on individual packages of yarn and the packages of yarn were then collected, placed on a creel and beamed. The beam was then mounted on a Sulzer projectile loom where similar packages of coated yarn were used as fill yarns, and the loom was used to produce a plain weave of coated yarn fabric. The fabric was then tentered in an oven at about 120 degrees Celsius and fed at a rate to insure that the polymer was slightly fused to insure that the woven pattern was locked into place after cooling. 3 inch by 8 inch fabric swatches were then cut form the roll of fabric, conditioned and tested via the vertical and horizontal battery of flame retardancy tests described. A small portion of fabric was cut into specimens and tested via the NBS smoke density test. The test results were then recorded and relative performance value was established and recorded in the table at the conclusion of testing all samples.

Example 2 involved the use of flame retardant concentrate #2 and additive concentrate #2 in the compositions formulation and yielded surprising and unexpected results. Firstly, the polymer composition was able to be extrusion coated onto a yarn substrate and further processed at high rates of speed which yields commercially viable rates of manufacture in coating the yarn and further processing the yarns into a fabric via traditional textile processing. Additionally, the coated yarns and resultant fabric were observed to have very acceptable surface appearance and were aesthetically pleasing to the touch (hand) and eye due to the smooth and uniform surface of the coated yarn allowing its textile processing into a useful fabric. Also, the mechanical properties before and after exposure to accelerated weathering tests of the fabric were found to be acceptable for use in a number of end use applications, and, lastly, the coated yarn fabric was observed to pass a battery of flame retardant performance tests listed though it is through the use of high levels of a brominated organic flame retardant in combination with an antimony oxide synergist. This was surprising due to the fact that the polypropylene core yarns which were used to melt extrusion coat the elastomeric polyolefin composition did not comprise a flame retardant and as such would be considered an additional non-flame retarded fuel source. Therefore, the fact that the use of certain brominated organic flame retardants in polyolefin elastomeric compositions used to melt extrusion coat non-flame retardant yarns leads to end use yarns and fabrics made from them that have acceptable and commercially useful flame retardant properties is a very economical and useful finding as it precludes the use of more expensive flame retardant core yarns as a starting core yarn material.

The elastomeric polyolefin composition of Example 2 when used to manufacture coated yarns and fabrics made from them, though having very acceptable flame retardant, mechanical, aesthetic, hand and drape, and weathering properties to the extent that upholstery, sling fabrics, tenting, wall coverings, window treatments and floor coverings could be made from it, could be used as end use replacement articles for articles historically manufactured using flexible PVC or other elastomeric compositions, does suffer from two draw backs. Specifically it would be more desirable to have a lower relative smoke density and lower relative levels of toxic gas emissions compared to Example 1 in Table 3 during the combustion of elastomeric polyolefin compositions that require flame retardants and flame retardant synergists to be added to their composition. Example 2 uses approximately 8.4% of tetrabromo his phenol A bis(2,3,-dibromopropyl ether) and 2.8% of antimony trioxide as its flame retardant system based on the weight of the elastomeric polyolefin composition and slightly less when basing that percentage of flame retardants and synergists when factoring in the total weight of the elastomeric polyolefin composition and non-flame retardant 100% polypropylene homopolymer core yarn. Tetrabromo bis phenol A bis(2,3,-dibromopropyl ether) is about 62% by weight bromine, a known halogen and therefore of longer term concern when considering the global commercial and regulatory trends to eliminate the use of higher levels of organic halogens from use as it relates to flame retardants. Also, evolution of halogenic acid gases are of concern when using higher concentrations of halogenated organic compounds such as hydrochloric acid and hydrobromic acid which are extremely toxic upon inhalation when flame retarded polymers contains higher levels of halogenated organic compounds. In the case of the composition of Example 2, evolution of detectable and potentially toxic concentrations of these halogenated acidic gases could be of concern and therefore undesirable, although the use of the coated yarn fabric described in Example #2 is considered commercially acceptable for the commercial building interior wall covering and window treatment markets at this time.

Example 3

Example 3 is an attempt to demonstrate that a substantially similar composition as Example 2 could be made to have better economics through the use of a performance filler material (Barium Sulfate) by replacing a portion of the more costly polypropylene homopolymer and polyoloefin elastomer (more specifically a metallocene catalyzed low density polyethylene elastomer or POE, Engage 8407 from Dow) when used to melt extrusion coat core yarns and manufacture coated yarn fabrics from such coated yarns. The composition and its method of manufacture to produce the composition and coated yarn fabrics was the same as was used in Example 2. It was found that even though flame retardant concentrate (#2) was used at the same concentration relative to the weight of the total weight of the composition, the use of the 1.0 micron particle sized barium sulfate filler material to replace a portion of the fuel source (the polypropylene homopolymer and the POE polymer) actually prevented the elastomeric composition from achieving similar flame retardant properties. This is surprising considering that a substantial portion of the fuel source has been diluted by the mineral filler and the mineral filler is not a known source of combustion yet the flame retardant portion of the composition is actually higher in concentration relative to the burnable polymer. The reason for this is unknown but can perhaps be attributed to trace levels of alkaline impurities known to exist in mined barite, the mineral from which the grade of barium sulfate is derived. This explanation can not be totally acceptable. However, as subsequent trials not reported in the examples using a purified, precipitated grade of barium sulfate yielded similar results (poor flame retardant performance) where any alkaline contaminants have been eliminated. Additionally, NBS smoke density measurements of the composition, as used in coated yarn fabrics, resulted in unacceptably high levels of smoke. Something further unexpected that was a positive result was observed as a result of Example 3. That is, it was observed that the sound deadening properties of the coated yarn fabric were excellent and this is probably due to the high degree of density of the barium sulfate filler used. The most surprising observation made regarding sample 3 was the pronounced similarities in hand and drape of the coated yarn fabric when compared to fabrics of similar face weight and design made from flexible PVC coated yarns.

Even though the flame retardant properties and smoke density of the Example 3 composition were unacceptable when used in coated yarns and fabrics made from them, the noted benefits of the use of barium sulfate led to improvements in these compositions when trying to obtain excellent hand and drape properties that precisely mimic the hand and drape of flexible PVC coated yarn fabrics. This discovery led to further investigations in Example 4.

Example 4

Example 4 is an attempt to determine whether the improvements regarding hand and drape properties discovered in Example 3 could be further extended and achieve further improvements in cost economics. The Example 4 composition was conceived with the notion that, indeed, there are elastomeric polyolefin compositions with end use applications thereof that might not require flame retardant properties but might require high levels of sound deadening properties and/or improved drape and hand properties when compared to articles made from flexible PVC. For example, the use of flexible PVC to manufacture water hoses for use in gardening and lawn maintenance requires a high degree of flexibility, low Shore hardness, low cost, good mechanical properties, good weathering properties but no flame retardant properties. Therefore, Example 4 is an attempt to provide a composition that provides those properties. Also, Example 4 can be a candidate composition that might have utility for certain extrusion coated fabric or extrusion coated yarns that are manufactured into fabrics where meeting flame retardant specifications are not required or important. In the first intended end use application (water hose composition) the composition is prepared as previously described per the listed ingredients at the required percentages. The resultant pellets of the elastomeric polyolefin composition in Example 4 are then fed into a hopper of an injection molding machine with 30 tons of clamping force. 3 inch wide and 8 inch long and 0.040 inch thick plaques are then injection molded using a ramping heat profile starting at 180 degrees Celsius and ramping to 210 degrees Celsius. The plaques were allowed to cool, conditioned and then the mechanical, flame retardant, weathering, hand, Shore hardness and smoke density properties were determined. Surprisingly, the combined use of the mineral (barium sulfate) filler with the olefinic oil in the presence of the polyolefin elastomer (POE, Engage 8407 from Dow) resulted in extremely pleasing hand characteristics that very closely mimic the touch and handling associated with flexible PVC. The measured, lower shore A hardness with a value of 80 A clearly indicates the plasticizing effect of the olefinic oil (Elevast A80 from Exxon-Mobil). Additionally, the high level of barium sulfate combined with the Elevast oil resulted in ease of processing, excellent sound deadening properties and much improved raw material economics when comparing the cost of achieving the low Shore hardness without the use of the Elevast olefinic oil. This composition would be an excellent candidate material for water hoses due to its desirable mechanical properties, low cost, high weathering properties and ease of handling which very much mimics the hand of flexible PVC. It would also be an excellent non-flame retardant sound barrier material for use in molded or extruded sheet forms.

The same composition of Example 4 was also processed into coated yarns for end use evaluations and such coated yarn and textile processing to produce the fabric were the same as in Examples 1, 2, and 3. The use of the olefinic plasticizing effect from the Elevast COMBINED with the use of the higher levels of barium sulfate mineral filler to produce the coated yarns and coated yarn fabrics have exceptional hand and drape characteristics further improving upon these properties as compared to Example 3. This surprising and unexpected result not only yields coated yarns or coated yarn fabrics that have improved hand characteristics and drape but also very much improved economics as the use of higher levels of the mineral filler combined with the use of the plasticizing olefinic oil while obtaining the lower Shore hardness of 80 is accomplished with a very cost effective approach. However, it must be noted that flame retardant performance was poor and the use of this composition for coated yarns or coated yarn fabrics would have to be limited to fabric applications where flame retardant properties are either not important (sling fabrics for out door furnishings, industrial or other decorative fabrics not requiring flame retardant properties) or flame retardant properties would have to be imparted to the fabric via a flame retardant back coating, etc.

Examples 5 and 6

Both compositions from Example 5 and Example 6 were prepared as previously described and further processed as previously described into extrusion coated yarns and further processed via previously described textile processes to produce coated yarn fabrics. In each composition the choice of flame retardant system was different yet each composition was formulated so that a shore A hardness of about 89 A was achieved via a different choice of unmodified polyolefin elastomer. In Example 5 the choice of unmodified elastomeric polyolefin chosen was a grade of metallocene catalyzed low density polyethylene elastomer (the POE, Engage 8407) used in previous coated yarn formulations and it is the addition of this polymer that imparts the elastomeric and flexible properties to the overall composition. In Example 6 a different unmodified elastomeric polyolefin (described as a "reactor TPO" but more specifically an elastomeric ethylene modified heterophasic polypropylene/ethylene co-polymer having a melt flow index of 27 grams per 10 minutes) was chosen to impart the same degree of flexibility and elastomeric (Shore hardness and hand) properties to the overall elastomeric polyolefin composition as Example 5. In both instances the coated yarns and coated yarn fabrics produced from them had similar, high quality appearance and processed similarly, readily and at economically acceptable rates in both extrusion and textile processing. The mechanical properties of the yarns and fabric produced from them have similar (but not exactly identical, yet acceptable) values. In the case of Example 5, the choice of flame retardant concentrate #3 resulted in coated yarns and coated yarn fabrics made from them to have very acceptable flame retardant properties, yet the smoke density values were not ideally low. Unfortunately, upon accelerated weathering, the flame retardant chemical used (tris(tribromoneaopentyl) phosphate from Dead Sea Bromine Group) resulted in unacceptable surface appearance issues in that even though the manufacturer described the use of the flame retardant as "non-migratory", the resultant migration of the flame retardant chemical to the surface of the composition surface indicated otherwise. Though the chemical was found to be an effective flame retardant as previously described, severe migration and re-crystallization of the flame retardant was observed to occur on the surface of the composition and was not acceptable. In an attempt to solve this problem while maintaining the other required physical and performance properties of the composition as it relates to its end use application(s), Example 6 was formulated thusly.

Surprisingly, it was found that use of flame retardant concentrate #1, containing the aluminum hypophosphorous acid metal salt and a brominated organic flame retardant compound, when used in combination with the chosen elastomeric polyolefin (Equistar-Lyondell-Basell's reactor TPO, Adflex Z108S, an elastomeric ethylene modified heterophasic polypropylene/ethylene co-polymer) yielded a functionally, aesthetic, and performance equivalent elastomeric polyolefin composition when compared to Examples 1, 2, 3, 4 and 5 and met all of the flame retardant property requirements with no appreciable discoloration after exposure to UV light! All the required properties, except sound deadening, of the elastomeric polyolefin composition of Example 6 were much improved in coated yarn and coated yarn fabrics made from them compared to Examples 1, 2, 3, 4 and 5. The flame retardant properties obtained with Example 6 were of particular importance because it was not possible to achieve the same "balance of properties" with the compositions found in Examples 1, 2, 3, 4, and 5. Of particular interest is that in Example 1 the use of a metallocene low density polyethylene elastomer (Dow's Engage 8407) was used to impart the required flexibility, Shore hardness and hand, with acceptable (good) mechanical properties, yet high levels of discoloration and poor accelerated weathering. Perhaps the discoloration and poor retention of mechanical properties would lead one skilled in the art to conclude that a better UV stabilizer and antioxidant system would be required to improve upon such performance of the fabric. What is unexpected, however, is that the flame retardant chosen, the most preferred aluminum hypophosphous acid salt in the presence of the brominated flame retardant chemical tetrabromo bis phenol A bis(2,3,-dibromopropyl ether) would not work in the presence of the Dow Engage 8407 (a metallocene low density polyethylene elastomer), but does work exceptionally well in the presence of the Basell Z108S reactor TPO (an elastomeric ethylene modified heterophasic polypropylene/ethylene co-polymer) which allowed the over all composition to achieve the look, feel and functionality of flexible PVC coated yarns in everyway necessary to be able to replace flexible PVC for use in those same coated yarn and coated yarn fabrics in which flexible PVC compositions have been overwhelmingly considered the most economically and functionally acceptable polymer composition of choice for many years commercially. Another important discovery of note, as it pertains to Example 6, is that the flame retardant properties of the elastomeric polyolefin composition or Example 6 applies to the entire coated yarn or coated yarn fabric construction. Furthermore, it was found that the composition used Example 6 achieved a commercially acceptable flame retardant elastomeric polyolefin composition Shore A hardness of less than 90, and it lead to further experimentation leading to lower Shore A hardness compositions, shown in Examples 7, 8 and 10. This means that the elastomeric polyolefin composition had such remarkable and effective flame retardant properties that it imparted those properties to the non-flame retarded core yarns used to produce the coated yarns resulting in the passing of the many different kinds of vertical and horizontal flame retarded tests in which the coated yarn fabrics were subjected. This is surprising, as the non-flame retarded core yarns were comprised of a fiber grade polypropylene homopolymer that was further comprised of a non-flame retarded fiber surface processing lubricant which by itself resulted in a complete failure of all flame retardant tests it was subjected to when the elastomeric polyolefin composition of Example 6 is not extrusion coated onto the surface of the core yarn. Lastly, of further note, is the observation that coated yarns and coated yarn fabrics comprised of the elastomeric polyolefin composition in Example 6 showed very low smoke density permitting their use in some of the most demanding of low smoke applications such as aerospace fabrics and composites.

TABLE 4

| Component | Example 7 | Example 8 | Example 9 | Example 10 |
|---|---|---|---|---|
| Additive Concentrate #1 | 5.0% | 5.0% | 5.0% | |
| Additive Concentrate #2 | | | | 5.0% |
| Flame Retardant Concentrate #1 | 8.0% | 8.0% | 8.0% | 8.0% |
| Flame Retardant Concentrate #2 | | | | |
| Flame Retardant Concentrate #3 | | | | |
| 70% Cimbar Baryte EX (1 micron Barium Sulfate) in Sunoco P-603 Carrier | | | | |
| 70% Titanium Dioxide (R-101 from DuPont) in Basell Z108S Reactor TPO | 7.0% | 7.0% | 7.0% | 7.0% |
| Off White Custom Color Concentrate (Blend of Organic and Inorganic Pigments dispersed in Sunoco P603 Resin) | | | | |
| 45% Elevast A-80 (from Exxon-Mobil) Olefinic Oil Concentrate in P603 Polypropylene Carrier | | | | |
| 30% Glass Filled Polypropylene from Washington Penn | | | | |
| Engage 8407 (30 MFI POE - Polyolefin Elastomer) | | | 45.0% | |
| Basell Adflex Q100F (0.6 MFR - Reactor TPO) | | | | 80.0% |
| Basell Adflex V109F (12 MFR - Reactor TPO) | | | | |
| Basell Adflex Z108S (27 MFR - Reactor TPO) | | | | |
| Dow Versify 3300 (8 MFR Propylene/ethylene Elastomer) | | 3% | | |
| Dow Versify 3401 (8 MFR Propylene/ethylene Elastomer) | 80% | 60% | | |
| Sunoco P603 Polypropylene Homopolymer | | | 17.0% | 35.0% |
| Total(s): | 100.0% | 100.0% | 100.0% | 100.0% |
| Geometric Form of | Cast Film | Cast Film | Cast Film | Blown and |

TABLE 4-continued

|  | Example 7 | Example 8 | Example 9 | Example 10 |
|---|---|---|---|---|
| Extrusion | Extrusion Coating | Extrusion Coating | Extrusion Coating | Cast Film Extrusion Coating |
| Type of Substrate Coated | Coated Fabric and Cast Films | Coated Fabric/ Scrims | Coated Fabric/ Scrims | N/A |
| Flame Retardant Performance Tests |  |  |  |  |
| NFPA-701 (All Years) | Pass | Pass | Fail | Pass |
| CPAI-84 (All Years) | Pass | Pass | Fail | Pass |
| ASTM E84 Class A Rating | Pass | Pass | Fail | Pass |
| FMVSS 302 | Pass | Pass | Fail | Pass |
| State of California Title 19 | Pass | Pass | Fail | Pass |
| State of California Tech Bulletin 133 | Pass | Pass | Fail | Pass |
| FAR 25.853 Appendix F, Part I (Aerospace) | Pass | Pass | Fail | Pass |
| NBS Smoke Density | Low | Low | Medium | Low |
| Shore A Hardness | 70 | 75 | 88 | 92 |
| Property Ratings |  |  |  |  |
| Replacement Index Key: 1 = Poor, 2 = Fair, 3 = Good, 4 = Very Good, 5 = Excellent, Max = 25 |  |  |  |  |
| Mechanical Properties in Machine Direction | 5.0 | 5.0 | 4.0 | 5.0 |
| Mechanical Properties in Cross Machine Direction | 5.0 | 5.0 | 4.0 | 5.0 |
| Hand and Flexibility | 5.0 | 5.0 | 5.0 | 5.0 |
| Retention of Mechanical Properties after Accelerated Weathering | 5.0 | 5.0 | 4.0 | 5.0 |
| Discoloration after Accelerated Weathering (1 = Very Poor, 5 = Excellent) | 5.0 | 5.0 | 3.0 | 5.0 |
| Totals: | 25.0 | 25.0 | 20.0 | 25.0 |

Example 7

The discovery that the use of flame retardant concentrate #1 comprising the hypophosphous acid metal salt and brominated organic compound, tetrabromo bis phenol A bis(2,3,-dibromopropyl ether) at the usage levels indicated lead to the notion that there could be other elastomeric TPO or propylene/ethylene copolymers that yield similar elastomeric polyolefin compositions that could give the appearance, hand, and performance functionality of flexible PVC in other applications where flexible PVC is currently used and needs to be replaced due to regulatory and commercial pressure to do so. In particular, flexible PVC films that are laminated onto fabrics and scrims are very widely used in a number of important commercial, institutional and consumer end use applications including automotive interiors, wall coverings, upholstery, advertising banners and films, tenting, juvenile care products and mattresses, medical and prison bedding, window treatments, floor coverings, interior and exterior decorative fabrics, aerospace composites and fabrics, and billboard fabrics. It would be of extreme utility if a composition similar to Example 6, Example 7 in this case, could be cast film extrusion coated onto fabrics and scrims yielding extrusion coated fabrics that had the appearance, hand and full functionality as their flexible PVC equivalents. Furthermore, if the composition of Example 7 could impart its flame retardant properties to the scrim or fabric onto which it was adhered saving the cost of requiring the use of a flame retardant scrim or fabric onto which to extrusion coat the polyolefin. Also there would be the added benefit of reducing manufacturing cost further as flexible PVC is often required to be calendared on inverted L-calendars which require a high upfront capital investment on the part of the converter and are expensive machines to operate and maintain. Additionally, manufacturing cost would be reduced even more because of the fact that when PVC films are manufactured using the calendar processing, the flexible PVC is first processed into a film and only then is the film laminated onto the substrate (fabric or scrim in this case) in a separate step. Therefore, extrusion coating the elastomeric polyolefin composition directly onto the fabric or scrim, which entails simultaneously embossing the film (through the use of an embossed chill roll) saves the entire extra manufacturing costs of embossing and laminating in a separate, more costly manufacturing step.

Therefore, Example 7 was really a series of trials using the same elastomeric polyolefin composition used as a stand alone material to cast films of various thickness and to cast film extrusion coated at various thicknesses onto various scrims and fabrics to demonstrate the range and depth of various end use constructions and how those extrusion coated fabrics can be used to replace similar end use applications that are currently manufactured using calendared flexible PVC films that is embossed and laminated onto scrims and fabrics in a separate step.

In Example 7, the composition and the cast film extrusion coated fabrics manufactured from it were prepared as described in Example 1. Cast films were obtained at a gauge of 1.0 mil (0.0001 inch), 2.0 mil (0.0003 inch), 5 mil (0.0005 inch), 7 mil (0.0007 inch), and 9 mil (0.0009 inch) thicknesses without their adherence to a substrate. The films obtained were cast with a matte finish chill roll and were of exceptional quality with no variation in their thickness, exceptional surface appearance, mechanical properties and hand. The films were all subjected to a battery of flame retardant performance testing indicated and all the films performed similarly in that the films being tested were exposed to the flame in a vertical position whereas the films drew away from the flame and immediately extinguished once they were free of the direct flame. No burning drips or excessive smoke density was noted.

Additionally, and though it is not indicated in Table 4, five different fabrics or scrims were chosen as the substrates onto which to cast film of Example 7 during the production of the cast film extrusion coating process. The fabrics used were:
1. 1.5 ounce per square yard point bonded spunbond non-woven scrim
2. 2.0 ounce per square yard polyester/wood pulp spun lace non-woven
3. 3.0 ounce per square yard polyester spunlace non-woven
4. 2.0 ounce per square yard glass fiber non-woven The composition of Example 7 was cast film extrusion coated at various gauges ranging from 1.0 mil to 10 mil thickness onto each substrate above. The composition extrusion coated uniformly at the thinner gauges with little to no variation in the thickness of the polymer across the face of the fabric or scrim. Once more, the mechanical properties, properties after weathering, and flame retardant properties of the extrusion coated fabrics mimicked the appearance, hand and other important properties of similar flexible PVC films of similar thickness that had been laminated onto similar or equivalent substrates. As was observed in Examples 2, 5, and 6, and of utmost importance was the observation that the elastomeric polyolefin composition of Example 7 not only was found to be flame retardant itself but was observed to impart its flame retardant properties to the overall extrusion coated fabric that it comprised. All of the cast film and extrusion coated fabrics produced in Example 7 using the indicated elastomeric polyolefin composition could be used as replacement materials where flexible PVC is used which includes automotive interiors, wall coverings, upholstery, advertising banners and films, tenting, juvenile care products and mattresses, medical and prison bedding, window treatments, floor coverings, interior and exterior decorative fabrics, aerospace composites and fabrics, and billboard fabrics. Most surprisingly was that in a quick printing test where various water based, solvent based and other kinds of inks were applied using a rubber roller, it was observed that the surface energy of the films was high enough that the spreading and initial adhesion of the inks was excellent. This indicated that depending on the ink, corona or surface plasma treatment of the films would insure long term excellent print definition, adhesion and very low or no crocking.

Example 8

Example 8 is an attempt to try and achieve the same levels of flame retardant performance and other functionality as Example 7 but using a different elastomeric polyolefin to impart the desired degree of Shore hardness and hand required of the composition for use in cast film extrusion coating fabrics and scrims with the appearance, hand and functionality as flexible PVC in end use applications such as automotive interiors, wall coverings, upholstery, advertising banners and films, tenting, juvenile care products and mattresses, medical and prison bedding, window treatments, floor coverings, interior and exterior decorative fabrics, aerospace composites and fabrics, and billboard fabrics. In this example, the use of another kind of elastomeric polypropylene/ethylene copolymer (Dow Versify) is used to impart the degree of flexibility, Shore hardness and therefore desired hand properties to the composition and the end use applications in which it will be used. Once again the composition and extrusion coated fabrics were prepared as in Example 7 and results of the battery of flame retardant, weathering, and mechanical property testing obtained were similar to the results of Example 7. Again, a quick printing test was preformed on the various fabrics and it was shown to have similar ease of printing as Examples 6 and 7.

Example 9

Example 9 was a similar attempt as Examples 7 and 8 to achieve the same levels of flame retardant performance and other functionality as Example 7 and Example 8 but using a different elastomeric polyolefin to impart the desired degree of Shore hardness and hand required of the elastomeric polyolefin composition for use in cast film extrusion coating fabrics and scrims with the appearance, hand and functionality as flexible PVC in end use applications such as automotive interiors, wall coverings, upholstery, advertising banners and films, tenting, juvenile care products and mattresses, medical and prison bedding, window treatments, floor coverings, interior and exterior decorative fabrics, aerospace composites and fabrics, and billboard fabrics. In this example, the use of the low density polyethylene polyolefin elastomer, Engage 8407 which as mentioned before is manufactured using a site specific metallocene catalyst to achieve its elastomeric properties and low Shore hardness. The resultant mechanical, appearance, hand and weathering properties were found to be acceptable but the flame retardant properties, as in Example 1, were found to be very poor with the incorporation of flame retardant concentrate #1. Also, the smoke density observed was higher as all of the films and coated fabrics or scrims produced continued to burn violently when subjected to the various flame retardant tests performed and failed all flame retardant tests performed. This led to a high smoke density being observed in the NBS smoke density test as would be expected with such flammable compositions and their end use applications. Obviously, the use of the flame retardant system found in flame retardant concentrate #1 will not work to flame retard compositions when used in combination with such elastomeric metallocene low density polyethylenes to achieve elastomeric polyolefin compositions that can be used as replacement polymers and their end use applications where flexible PVC or other flexible and elastomeric compositions are use in the various end use applications outlined.

Example 10

Example 10's composition was an attempt to obtain an acceptable film using a blown film process to form and manufacture such films. Such films can be used as stand alone films or could be used to laminate such films to an end use substrate. Though blowing a film separately and then laminating and embossing such films onto a substrate would add additional cost, there may be some applications where taking such an approach may be more convenient or economical. For example, in the case where a large volume of film of a given gauge is desired and little or no further processing is required, blown film processing can achieve films of exceptional mechanical properties as such films obtained through the blown film process can achieve high degrees of biaxial orientation and therefore advantageous mechanical properties. In the blown film process, the composition pellets would be charged to the extruder hopper where they are gravity fed or fed using a metering system to a single or twin screw extruder where the composition is melted, mixed and extruded through an annular die where air or some other gas is simultaneously forced at high speed at the lip of the die where the extrudate exits. This results in a cooling effect but also a lifting effect and the film extruded forms a bubble as the film is carried upward, guided by a directional cage where the bubble is collapsed and rolled flat onto a spool. The composition used as the polymer system in this example requires a high degree of melt strength and it would be beneficial to simultaneously achieve excellent mechanical properties from the blown film process. Therefore, in this example a higher molecular weight reactor TPO, Basell's Adflex Q100F, which has a melt flow rate of 0.6 grams per 10 minutes, is chosen to comprise the bulk of the composition and also impart the high degree of flexibility, low Shore hardness and hand to be a flexible PVC replacement candidate material. The films obtained with the elastomeric polyolefin composition of Example 10 were blown at 1.0 mil, 3 mil, 5 mil, 7 mil, and 9 mil. All the films had exceptional appearance, mechanical properties, weathering properties, excellent flame retardant properties and exceptionally low smoke density as measured by NBS smoke density testing. These films can be embossed and or printed on before or after corona treatment depending on the ink system used and the exceptional flame retardant properties would allow these films to be used for various end use applications where flexible PVC or other elastomeric and flexible polymer compositions are used. The films extruded at the thicker gauges, 7 mils and 9 mils, might be excellent shower curtain films for hospitality applications, or could be used as lamination films for various end use applications where flame retardant and flexible properties are required such as juvenile care products, juvenile bedding, medical bedding, prison bedding films, tarps, tenting, and awning films.

TABLE 5

| Component | Example 11 | Example 12 |
|---|---|---|
| Additive Concentrate #1 | 5.0% | |
| Additive Concentrate #2 | | |
| Flame Retardant Conentrate #1 | 8.0% | 8.0% |
| Flame Retardant Conentrate #2 | | |
| Flame Retardant Conentrate #3 | | |
| 70% Cimbar Baryte EX (1 micron Barium Sulfate) in Sunoco P-603 Carrier | | |
| 70% Titanium Dioxide (R-101 from DuPont) in Basell Z108S Reactor TPO | | |
| Off White Custom Color Concentrate (Blend of Organic and Inorganic Pigments dispersed in Sunoco P603 Resin) | 5.0% | |
| 45% Elevast A-80 (from Exxon-Mobil) Olefinic Oil Concentrate in P603 Polypropylene Carrier | | |
| 30% Glass Filled Polypropylene from Washington Penn | 40.0% | |
| Engage 8407 (30 MFI POE - Polyolefin Elastomer) | | |
| Basell Adflex Q100F (0.6 MFR - Reactor TPO) | | |
| Basell Adflex V109F (12 MFR - Reactor TPO) | 42.0% | |
| Basell Adflex Z108S (27 MFR - Reactor TPO) | | |
| Dow Versify 3300 (8 MFR Propylene/ethylene Elastomer) | | 92.0% |
| Dow Versify 3401 (8 MFR Propylene/ethylene Elastomer) | | |
| Sunoco P603 Polypropylene Homopolymer | | |
| Total(s): | 100.0% | 100.0% |
| Geometric Form of Extrusion | Extrusion and Sheet Extrusion | Fiber and Yarns |
| Type of Substrate Coated | Profile and Sheet Extrusions | N/A |
| Flame Retardant Performance Tests | | |
| NFPA-701 (All Years) | N/A | Pass |
| CPAI-84 (All Years) | N/A | Pass |
| ASTM E84 Class A Rating | N/A | Pass |
| FMVSS 302 | Pass | Pass |
| State of California Title 19 | N/A | Pass |
| State of California Tech Bulletin 133 | N/A | Pass |
| FAR 25.853 Appendix F, Part I (Aerospace) | Pass | Pass |
| NBS Smoke Density | Low | Low |
| Shore A Hardness | N/A | N/A |
| Property Ratings | | |
| Replacement Index Key: 1 = Poor, 2 = Fair, 3 = Good, 4 = Very Good, 5 = Excellent, Max = 25 | | |
| Mechanical Properties in Machine Direction | 5.0 | 5.0 |
| Mechanical Properties in Cross Machine Direction | 5.0 | 5.0 |
| Hand and Flexibility | 5.0 | 5.0 |
| Retention of Mechanical Properties after Accelerated Weathering | 5.0 | 5.0 |
| Discoloration after Accelerated Weathering (1 = Very Poor, 5 = Excellent) | 5.0 | 5.0 |
| Totals: | 25.0 | 25.0 |

Example 11

Example 11 is an effort to demonstrate an elastomeric polyolefin composition that utilizes flame retardant concentrate #1 for end use applications that require the composition to be extruded via a profile or sheet and where flexible PVC and other elastomeric compositions are used because of its excellent flame retardant properties while maintaining its flexibility, relative low Shore hardness, good weathering properties, and acceptable mechanical properties.

In this Example 11, the composition is charged to the hopper of a single screw or twin screw extruder and it is gravity fed or by some other metering to the extruder throat where it is melted mixed and forced via pressure through die having a simple or complex multifaceted profile. The extrudate is then cooled via water mist, water bath and/or chilled rolls and then the semi-solid extrudate is then cut in periodic sections to the desired which comprises a continuous process. The end use parts of a given length and dimensions are then collected and the regiment of mechanical, accelerated weathering, Shore hardness and flame retardant performance testing is conducted. The sheets or profile lengths obtained are observed to have excellent flame retardant properties and are extremely easy to extrude drawing minimal amps of current on the extruder and forming parts of or sheet with well defined and smooth edges. The sheet or profiles are excellent articles as replacement materials where flexible PVC or other elastomeric polymers (thermoplastic urethanes for example) are used such as weather stripping, siding materials for buildings of all kinds, aerospace floor spacing, gap filler for commercial or private aircraft, automotive interior or exterior parts, etc. This examples demonstrates the ease of processing of such sheeting or profiles with a balance of properties while maintaining excellent flame retardant properties without the need to resort to injection molding similar geometries.

Example 12

This example demonstrates the remarkable ability of these elastomeric polyolefin compositions to not only replace the traditional end use applications where flexible PVC has been used, but to replace other elastomeric compositions and even improve upon their use in fiber and yarn end use applications. For example, polyurethane copolymers are commonly used to manufacture filaments and yarns (known under the trade name Spandex or Lycra) that have remarkable elastomeric properties that include the ability to demonstrate 100% elastic recovery after being fully elongated. However, Spandex/Lycra containing fabric where a majority of the fiber content of the fabric is composed of Spandex/Lycra is not commonly found to require any flame retardant performance properties. Spandex or Lycra has primarily been relegated to use in apparel applications where flame retardant properties are not required or important or if the fabric does need to have certain flame retardant properties, the percentage by weight of Spandex or Lycra present is very minimal (less than 3% to 5%). The composition of Example 12 demonstrates an elastomeric polyolefin composition that when melt spun into a plurality of filaments forms multifilament yarns that exhibit 100% elastic recovery and remarkable flame retardant properties.

In Example 12 the pellets of the elastomeric polyolefin composition listed in Table 5 Example 12 were charged to the hopper of a single screw extruder with a heat profile that ramped from 170 degrees Celsius to 210 degrees Celsius and the composition was melted, mixed and forced via pressure through a spinneret comprised of round capillaries with a round cross section. As the molten polymer composition exited the spinneret capillaries, a plurality of filaments were formed. The filaments were quenched as they were directed down an air quench stack and then directed over a fiber lubricant applicator where a standard synthetic fiber lubricant was applied. The filaments were then drawn over two sets of godet rolls where the filaments were drawn at a 3 to 1 ratio. The filaments were then directed and fed to a winder were the filaments formed a multifilament yarn which was carefully wound onto a spool via a winder with traverse guide.

The yarn obtained had the property of 100% elastic recovery upon being elongated to a maximum extent. The yarn was knitted into a sock, conditioned and then mounted in a vertical test chamber to test whether the knitted sock possessed flame retardant properties. The knitted sock comprised of the elastomeric polyolefin composition of Example 12 demonstrated the remarkable flame retardant properties indicated in that it met all of the flame retardant properties required of the tests conducted via the list in Table 5. The knitted yarn sock demonstrated such remarkable flame retardant properties in that the flame retardant yarn that comprised the sock drew away from the flame of the burner and immediately extinguished having no burning drips and a zero second after flame thereby indicating that fibers and yarns comprised of the elastomeric polyolefin composition of Example 12 would easily pass the tests indicated whether such yarns or fibers were used to construct knitted, woven or non-woven constructions provided that the constructions were comprised of at least a majority of such flame retardant fibers or yarns. Such flame retardant elastomeric fabric constructions could be used in a number of different aerospace, industrial, tenting and awning, and commercial fabric applications.

The invention claimed is:

1. An elastomeric polyolefin composition comprising:
(a) at least one flexible or elastomeric polyolefin polymer;
(b) a sufficient amount of polypropylene homopolymer in a concentration to impart said composition to a final Shore A hardness of between 50 and 96;
(c) a brominated flame retardant;
(d) a hypophosphorous acid metal salt having the following general formula:

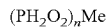

where Me is a metal atom belonging to the groups I, II, III, or IV of the periodic table of the elements, and n is an integer number ranging from 1 to 4 depending on the valence of the metal Me;
(e) a plurality of selected additives consisting of 0% to 0.25% by weight of migratory surface modifiers which act as external lubricants, 0% to 2% by weight of tertiary sterically hindered amine ultra violet light stabilizer(s), organic pigments and colorants and/or inorganic pigments and colorants; and
(f) either no filler, or a filler having a pH of less than 7.0;
whereby said elastomeric polyolefin composition has a density of less than 1.0 gram per cubic centimeter and a Shore A hardness of between about 60 and 94 as measured according to ASTM D-2240,
whereby the final elastomeric composition can be extrusion processed using cast film extrusion, extrusion coating onto a substrate, cross head extrusion coating onto a monofilament or multifilament yarn, calendaring, or used in a blown film extrusion process.

2. An article of manufacture comprising the elastomeric polyolefin composition of claim 1 which has been formed into a film, whereby said film meets or exceeds the requirements of the flame retardant specifications as defined for textiles by the National Fire Protection Association Test 701, year editions 1989, 1999, 2004 and 2010.

3. An article of manufacture comprising the elastomeric polyolefin composition of claim 1 which has been formed into an extrusion coated fabric or a calendared film which has been adhered onto a fabric, whereby said coated fabric meets or exceeds the requirements of the flame retardant specifications as defined for textiles by the National Fire Protection Association Test 701, year editions 1989, 1999, 2004 and 2010.

4. An article of manufacture comprising the elastomeric polyolefin composition of claim 1 which has been formed into a laminated article comprising a film that is laminated onto a supportive scrim fabric or a calendared film adhered to a supportive scrim fabric, and said laminated article, extrusion coated fabric, calendared film adhered to a supportive scrim fabric, or laminated fabric meets or exceeds the requirements of the flame retardant specifications as defined for textiles by the National Fire Protection Association Test 701, year editions 1989, 1999, 2004 and 2010.

5. An article of manufacture comprising the elastomeric polyolefin composition of claim 1 which has been formed into a film, whereby said film meets or exceeds the requirements of the flame retardant specifications as defined for textiles and related constructions by the California State Fire Marshal Title 19 California Code of Regulations.

6. An article of manufacture comprising the elastomeric polyolefin composition of claim 1 when coated onto a multifilament or monofilament textile or other yarn via an extrusion coating or cross head die extrusion process and said yarns are woven or in some other way formed into a usable fabric, such fabrics meet or exceed the requirements of the flame retardant specifications as defined for textiles by the National Fire Protection Association Test 701, year editions 1989, 1999, 2004 and 2010.

7. An article of manufacture comprising the elastomeric polyolefin composition of claim 1 which has been formed into an extrusion coated fabric or a calendared film which has been adhered onto a fabric, whereby said coated fabric meets or exceeds the requirements of the flame retardant specifications as defined for textiles and related constructions by the California State Fire Marshal Title 19 California Code of Regulations.

8. An article of manufacture comprising the elastomeric polyolefin composition of claim 1 which has been formed into a laminated article comprising a film that is laminated onto a supportive scrim fabric or a calendared film adhered to a supportive scrim fabric, whereby said laminated article, extrusion coated fabric, or a calendared film adhered to a supportive scrim fabric, or laminated fabric meets or exceeds the requirements of the flame retardant specifications as defined for textiles and related constructions by the California State Fire Marshal Title 19 California Code of Regulations.

9. The composition of claim 1 that when coated onto a multifilament or monofilament textile or other yarn via an extrusion coating or cross head die extrusion process and said yarns are woven or in some other way formed into a usable fabric, such fabrics meet or exceed the requirements of the flame retardant specifications as defined for textiles and related constructions by the California State Fire Marshal Title 19 California Code of Regulations.

* * * * *